US010069524B2

(12) United States Patent
Suzuki et al.

(10) Patent No.: US 10,069,524 B2
(45) Date of Patent: Sep. 4, 2018

(54) WIRELESS COMMUNICATION METHOD, ENODEB, AND USER EQUIPMENT

(71) Applicant: Panasonic Intellectual Property Corporation of America, Torrance, CA (US)

(72) Inventors: Hidetoshi Suzuki, Kanagawa (JP); Lilei Wang, Beijing (CN); Michael Einhaus, Darmstadt (DE); Yoshihiko Ogawa, Kanagawa (JP); Masayuki Hoshino, Kanagawa (JP); Li Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 201 days.

(21) Appl. No.: 15/021,253

(22) PCT Filed: Sep. 25, 2013

(86) PCT No.: PCT/CN2013/084180
§ 371 (c)(1),
(2) Date: Mar. 10, 2016

(87) PCT Pub. No.: WO2015/042798
PCT Pub. Date: Apr. 2, 2015

(65) Prior Publication Data
US 2016/0226534 A1    Aug. 4, 2016

(51) Int. Cl.
*H04J 1/12* (2006.01)
*H04B 1/10* (2006.01)
(Continued)

(52) U.S. Cl.
CPC ............ *H04B 1/10* (2013.01); *H04J 11/0053* (2013.01); *H04L 5/0073* (2013.01); *H04W 72/0406* (2013.01)

(58) Field of Classification Search
None
See application file for complete search history.

(56) References Cited

U.S. PATENT DOCUMENTS

2012/0236736 A1* 9/2012 Frank .................... H04W 24/04
370/252
2013/0010682 A1   1/2013 Kim et al.
(Continued)

FOREIGN PATENT DOCUMENTS

CN    101534560 A    9/2009
CN    102143595 A    8/2011
(Continued)

OTHER PUBLICATIONS

International Search Report dated Jul. 4, 2014, for corresponding International Application No. PCT/CN2013/084180, 2 pages.

*Primary Examiner* — Michael J Moore, Jr.
(74) *Attorney, Agent, or Firm* — Seed IP Law Group LLP

(57) ABSTRACT

The wireless communication method used for transmitting interfering resource allocation information (IRAI) comprises a step of transmitting the IRAI through L1 signaling from the serving eNB to the victim UE, wherein the IRAI indicates only interfering resource block (RB) allocation within the bandwidth of RBs allocated to the victim UE at least in the case that the resource allocation type of the interfering UE is type 0, type 1, or type 2-L. The resource allocation type of the interfering UE can be signaled from the serving eNB to the victim UE within the downlink control information (DCI) of the victim UE for allocating resource. The indication mode of the IRAI for at least one interfering UE among the multiple interfering UEs that belong to a same interfering cell can be dependent on those interfering UEs whose IRAI has been indicated among the multiple interfering UEs.

20 Claims, 11 Drawing Sheets

Prior Art                First Embodiment

(51) Int. Cl.
    *H04J 11/00*     (2006.01)
    *H04L 5/00*     (2006.01)
    *H04W 72/04*     (2009.01)

(56) References Cited

U.S. PATENT DOCUMENTS

| | | |
|---|---|---|
| 2013/0034072 A1 | 2/2013 | Kim et al. |
| 2013/0188566 A1 | 7/2013 | Zhu et al. |
| 2014/0233457 A1* | 8/2014 | Koutsinnanis ......... H04J 11/005 370/328 |
| 2015/0078302 A1* | 3/2015 | Reial .................... H04L 5/0053 370/329 |
| 2015/0208410 A1* | 7/2015 | Koutsinnanis ........ H04W 24/10 370/252 |
| 2015/0358105 A1* | 12/2015 | Jung ................... H04J 11/0056 370/329 |
| 2015/0372779 A1* | 12/2015 | Lim ...................... H04J 11/005 370/338 |
| 2016/0044566 A1* | 2/2016 | Nammi ................. H04B 1/1027 370/331 |
| 2016/0165616 A1 | 6/2016 | Ohwatari et al. |
| 2016/0295597 A1* | 10/2016 | Franz .................... H04W 76/02 |

FOREIGN PATENT DOCUMENTS

| | | | |
|---|---|---|---|
| CN | 102845121 | A | 12/2012 |
| EP | 2 512 175 | A1 | 10/2012 |
| JP | 2015-023454 | A | 2/2015 |

\* cited by examiner

200

Transmitting the IRAI through L1 signaling from the serving eNB to the victim UE, wherein the IRAI indicates only interfering RB allocation within the bandwidth of RBs allocated to the victim UE at least in the case that the resource allocation type of the interfering UE is type 0, type 1, or type 2-L  201

1300

Receiving the IRAI transmitted through L1 signaling from the serving eNB to the victim UE, wherein the IRAI indicates only interfering RB allocation within the bandwidth of RBs allocated to the victim UE at least in the case that the resource allocation type of the interfering UE is type 0, type 1, or type 2-L — 1301

1900

| Transmitting the IRAI of the multiple interfering UEs through L1 signaling from the serving eNB to the victim UE, wherein the indication mode of the IRAI for at least one interfering UE among the multiple interfering UEs is dependent on those interfering UEs whose IRAI has been indicated among the multiple interfering UEs | 1901 |

2200

Receiving the IRAI of the multiple interfering UEs transmitted through L1 signaling from the serving eNB to the victim UE, wherein the indication mode of the IRAI for at least one interfering UE among the multiple interfering UEs is dependent on those interfering UEs whose IRAI has been indicated among the multiple interfering UEs    2201

WIRELESS COMMUNICATION METHOD, ENODEB, AND USER EQUIPMENT

TECHNICAL FIELD

The present disclosure relates to the field of wireless communication, and in particular, to a wireless communication method for communicating interfering resource allocation information (IRAI), and an eNode B (eNB) and user equipment (UE) therefor.

BACKGROUND

NAICS (Network-Assisted Interference Cancellation and Suppression) is SI (Study Item) in LTE (Long Term Evolution) Rel.12 and targeted to realize advanced receiver to cancel/suppress interference in UE side by assistance of network signaling. The main task of NAICS SI is to investigate an enhanced receiver with network-assistant for mitigating the co-channel interference coming from inter-cell, intra-cell, or inter-stream.

In NAICS, with the help of eNB indication, an advanced receiver at UE could estimate the effective channel of the interference signal, demodulate the interference signal, and decode the interference signal. Accordingly, there are 3 types of NAICS receivers under discussion of 3GPP as follows: a) Interference suppression (IS) which can estimate the effective channel of the interference signal; b) Symbol-level interference cancellation (SLIC) which can estimate the effective channel of the interference signal and demodulate the interference signal; c) Codeword-level interference cancellation (CWIC) which can estimate the effective channel of the interference signal, demodulate the interference signal, and decode the interference signal. FIG. 1 illustrates a schematic diagram of the three types of NAICS receivers. The IS receiver comprises an effective channel estimator and a channel equalizer, the SLIC receiver comprises a demodulator in addition to the components of the IS receiver, and the CWIC receiver comprises a descrambler and a channel decoder supporting HARQ in addition to the components of the SLIC receiver.

Among the three types of receiver, SLIC, which needs only symbol-level interference information, is a good compromise between performance and complexity. The present disclosure focuses on SLIC receiver only. However, the present disclosure also applies to the IS receiver.

As an interference could be a dynamically scheduled signal of an interfering cell, such interference indication can be unicast indication of L1 (physical layer) signaling ((E)PDCCH) from a serving cell if backhaul is ideal. UE-specific information for each interferer (interfering UE), e.g. Resource Block (RB) allocation and MCS/PMI/RI (Modulation and Coding Scheme/Precoding Matrix Indicator/Rank Indication), should be indicated through L1 signaling. On the other hand, some long term information, such as cell-specific information, can be signaled by RRC (Radio Resource Control). For example, cell-specific information of an interfering cell, e.g. NeighCellsCRS-Info-r11 and CRS (Cell-Specific Reference Signal) power boosting factor (p-b), can be indicated in advance by RRC signaling.

In the interference indication, RB information occupies a large ratio of the bits used for the interference indication, especially for a wide bandwidth. Therefore, how to indicate RB information of interferer efficiently becomes an important issue.

SUMMARY OF THE DISCLOSURE

The present disclosure is made in view of the above in order to indicate RB information of interferer efficiently.

In a first aspect of the present disclosure, there is provided a wireless communication method for transmitting interfering resource allocation information (IRAI) of an interfering user equipment (UE) attached to an interfering cell by a serving eNode B (eNB) to a victim UE attached to the serving eNB, comprising a step of transmitting the IRAI through L1 signaling from the serving eNB to the victim UE, wherein the IRAI indicates only interfering resource block (RB) allocation within the bandwidth of RBs allocated to the victim UE at least in the case that the resource allocation type of the interfering UE is type 0, type 1, or type 2-L.

In a second aspect of the present disclosure, there is provided a wireless communication method for transmitting interfering resource allocation information (IRAI) of an interfering user equipment (UE) attached to an interfering cell by a serving eNode B (eNB) to a victim UE attached to the serving eNB, comprising steps of: signaling the resource allocation type of the interfering UE from the serving eNB to the victim UE within the downlink control information (DCI) of the victim UE for allocating resource to the victim UE or through RRC signaling; and transmitting the IRAI through L1 signaling from the serving eNB to the victim UE.

In a third aspect of the present disclosure, there is provided a wireless communication method for transmitting interfering resource allocation information (IRAI) of multiple interfering user equipments (UEs) attached to a same interfering cell by a serving eNode B (eNB) to a victim UE attached to the serving eNB, comprising a step of transmitting the IRAI of the multiple interfering UEs through L1 signaling from the serving eNB to the victim UE, wherein the indication mode of the IRAI for at least one interfering UE among the multiple interfering UEs is dependent on those interfering UEs whose IRAI has been indicated among the multiple interfering UEs.

In a fourth aspect of the present disclosure, there is provided a wireless communication method for receiving interfering resource allocation information (IRAI) of an interfering user equipment (UE) attached to an interfering cell by a victim UE from a serving eNode B (eNB) to which the victim UE is attached, comprising a step of receiving the IRAI transmitted through L1 signaling from the serving eNB to the victim UE, wherein the IRAI indicates only interfering resource block (RB) allocation within the bandwidth of RBs allocated to the victim UE at least in the case that the resource allocation type of the interfering UE is type 0, type 1, or type 2-L.

In a fifth aspect of the present disclosure, there is provided a wireless communication method for receiving interfering resource allocation information (IRAI) of an interfering user equipment (UE) attached to an interfering cell by a victim UE from a serving eNode B (eNB) to which the victim UE is attached, comprising steps of: receiving the resource allocation type of the interfering UE signaled from the serving eNB to the victim UE within the downlink control information (DCI) of the victim UE for allocating resource to the victim UE or through RRC signaling; and receiving the IRAI transmitted through L1 signaling from the serving eNB to the victim UE.

In a sixth aspect of the present disclosure, there is provided a wireless communication method for receiving interfering resource allocation information (IRAI) of multiple interfering user equipments (UEs) attached to a same interfering cell by a victim UE from a serving eNode B (eNB) to which the victim UE is attached, comprising a step of: receiving the IRAI of the multiple interfering UEs transmitted through L1 signaling from the serving eNB to the victim UE, wherein the indication mode of the IRAI for at least one interfering UE among the multiple interfering UEs is dependent on those interfering UEs whose IRAI has been indicated among the multiple interfering UEs.

In a seventh aspect of the present disclosure, there is provided an eNode B (eNB) for transmitting interfering resource allocation information (IRAI) of an interfering user equipment (UE) attached to an interfering cell to a victim UE attached to the eNB, comprising: a transmitting unit configured to transmit the IRAI through L1 signaling to the victim UE, wherein the IRAI indicates only interfering resource block (RB) allocation within the bandwidth of RBs allocated to the victim UE at least in the case that the resource allocation type of the interfering UE is type 0, type 1, or type 2-L.

In an eighth aspect of the present disclosure, there is provided an eNode B (eNB) for transmitting interfering resource allocation information (IRAI) of an interfering user equipment (UE) attached to an interfering cell to a victim UE attached to the eNB, comprising: a signaling unit configured to signal the resource allocation type of the interfering UE from the eNB to the victim UE within the downlink control information (DCI) of the victim UE for allocating resource to the victim UE or through RRC signaling; and a transmitting unit configured to transmit the IRAI through L1 signaling from the eNB to the victim UE.

In a ninth aspect of the present disclosure, there is provided an eNode B (eNB) for transmitting interfering resource allocation information (IRAI) of multiple interfering user equipments (UEs) attached to a same interfering cell to a victim UE attached to the eNB, comprising: a transmitting unit configured to transmit the IRAI of the multiple interfering UEs through L1 signaling from the eNB to the victim UE, wherein the indication mode of the IRAI for at least one interfering UE among the multiple interfering UEs is dependent on those interfering UEs whose IRAI has been indicated among the multiple interfering UEs.

In a tenth aspect of the present disclosure, there is provided a user equipment (UE) as a victim UE for receiving interfering resource allocation information (IRAI) of an interfering user equipment (UE) attached to an interfering cell from a serving eNode B (eNB) to which the victim UE is attached, comprising: a receiving unit configured to receive the IRAI transmitted through L1 signaling from the serving eNB to the victim UE, wherein the IRAI indicates only interfering resource block (RB) allocation within the bandwidth of RBs allocated to the victim UE at least in the case that the resource allocation type of the interfering UE is type 0, type 1, or type 2-L.

In an eleventh aspect of the present disclosure, there is provided a user equipment (UE) as a victim UE for receiving interfering resource allocation information (IRAI) of an interfering user equipment (UE) attached to an interfering cell from a serving eNode B (eNB) to which the victim UE is attached, comprising: a first receiving unit configured to receive the resource allocation type of the interfering UE signaled from the serving eNB to the victim UE within the downlink control information (DCI) of the victim UE for allocating resource to the victim UE or through RRC signaling; and a second receiving unit configured to receive the IRAI transmitted through L1 signaling from the serving eNB to the victim UE.

In a twelfth aspect of the present disclosure, there is provided a user equipment (UE) as a victim UE for receiving interfering resource allocation information (IRAI) of multiple interfering user equipments (UEs) attached to a same interfering cell from a serving eNode B (eNB) to which the victim UE is attached, comprising: a receiving unit configured to receive the IRAI of the multiple interfering UEs transmitted through L1 signaling from the serving eNB to the victim UE, wherein the indication mode of the IRAI for at least one interfering UE among the multiple interfering UEs is dependent on those interfering UEs whose IRAI has been indicated among the multiple interfering UEs.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figures 1, 2:
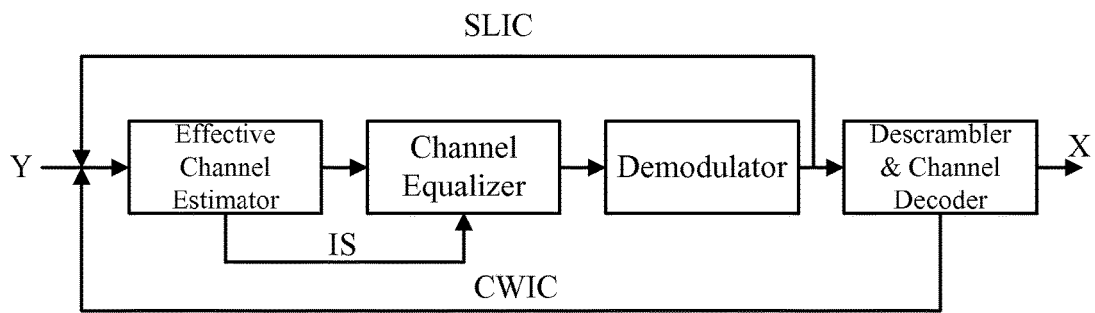
FIG. 1 illustrates a schematic diagram of three types of NAICS receivers.
FIG. 2 illustrates a wireless communication method at eNB side according to a first embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

In the present disclosure, it is assumed that the interference between an interfering cell and a victim UE is PDSCH (Physical Downlink Shared Channel) to PDSCH. However, it is obvious to those skilled in the art that the solutions disclosed in the present disclosure apply to the PDSCH-to-PDSCH interference indication in a scenario where other interferences exist, and the concept of the present disclosure also applies to other inferences, for example, in eIMTA (Further Enhancements to LTE TDD for DL-UL Interference Management and Traffic Adaptation), uplink signal of neighbor cells can also be a source of interference, and if both DL and UL interfering indications are supported, a DL/UL indicator may be needed in DCI.

In order to indicate the PDSCH-to-PDSCH interference, an interfering resource allocation information (IRAI) of the interfering UE attached to the interfering cell needs to be transmitted from the serving eNB to the victim UE attached to the serving eNB. The IRAI indicates which interfering RB(s) is/are allocated by the interfering cell to the interfering UE, and the victim UE can know which RB(s) is/are interfered from the IRAI. The IRAI can be indicated in an interfering DCI (Downlink Control Information) for indicating interference separated from the traditional DCI of the victim UE which indicates UE-specific information for the victim UE, such as RB allocation for the victim UE. In the present disclosure, the traditional DCI for indicating the UE-specific information for the victim UE is also referred to as the DCI of the victim UE for allocating resource to the victim UE, or simply as the DCI of the victim UE. In addition to the IRAI, the interfering DCI can also comprise other information, such as Modulation Order, TPMI (Transmitted Precoding Matrix Indicator)/RI, DMRS (Demodulation Reference Signal) ID, UE-specific CRS power boosting factor (p-a), etc. Table 1 illustrates an exemplary interfering DCI. It is noted that the inclusion of other information and the format of the interfering DCI shown in Table 1 is only an example, and is not intended to limit the present disclosure.

TABLE 1

| exemplary interfering DCI |  |
|---|---|
| IRAI |  |
| Modulation order |  |
| TM indicator 0 | TM indicator 1 |
| CRS based | DMRS based |
| p-a | Port index |
| TPMI | DMRS ID |
| Reserved |  |

The first embodiment of the present disclosure provides a wireless communication method for transmitting IRAI of an interfering UE attached to an interfering cell by a serving eNB to a victim UE attached to the serving eNB as shown in FIG. 2. FIG. 2 shows the wireless communication method 200 according to the first embodiment of the present disclosure. The method 200 comprises a step 201 of transmitting the IRAI through L1 signaling from the serving eNB to the victim UE, wherein the IRAI indicates only interfering RB allocation within the bandwidth of RBs allocated to the victim UE at least in the case that the resource allocation type of the interfering UE is type 0, type 1, or type 2-L. It is noted that the type 0, type 1, type 2-L, and type 2-D of the resource allocation type mentioned in the present disclosure refer to those defined in 3GPP TS 36.213: "Evolved Universal Terrestrial Radio Access (E-UTRA); Physical layer procedures", which is incorporated herein by reference.

According to the first embodiment, a concept is provided that, at least for some resource allocation types of the interfering UE (also referred to as interferer in the present disclosure), only interfering RBs overlapped with victim RBs (i.e., within the bandwidth of RBs allocated to the victim UE) need to be indicated for SLIC receiver, that is, the allocated RBs of the victim UE (i.e., victim RBs) are regarded as the "system bandwidth (SBW)" (referred to as virtual SBW) of the interfering RBs when indicating the interference to the victim UE. In this case, for both the channel estimation and the demodulation of interferer, only interfering signals in overlapped RBs would be reconstructed and canceled.

Figure 3:
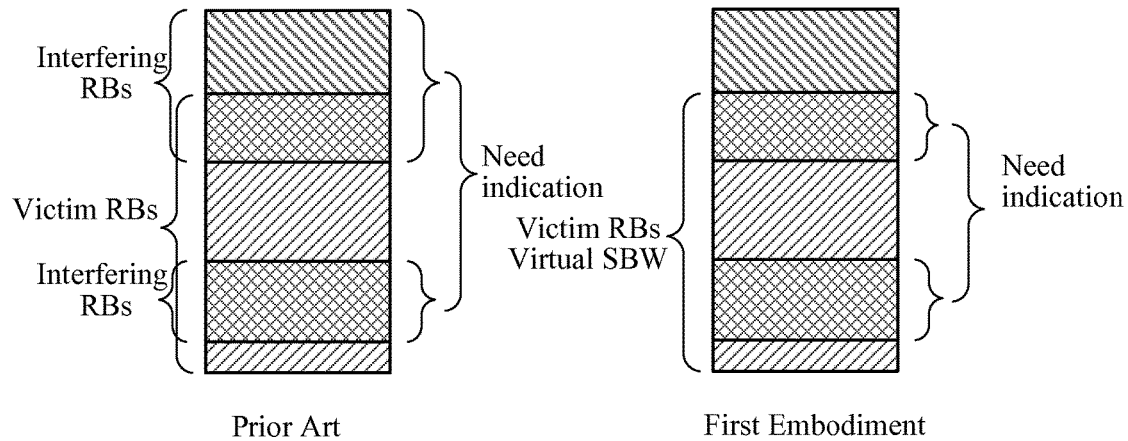
FIG. 3 illustrates a schematic diagram for explaining the virtual SBW of the interfering RBs used to indicate the interference.

FIG. 3 shows a schematic diagram for explaining the virtual SBW of interfering RBs used to indicate the interference. In FIG. 3, the areas filled with forward inclined lines or crossing lines represent the victim RBs (i.e., RBs allocated to the victim UE), and the areas filled with backward inclined lines or crossing lines represent the interfering RBs (i.e., RBs allocated to the interfering UE), wherein the areas filled with crossing lines represent the RBs which allocated to both victim UE and the interfering UE. According to the prior art, all the interfering RBs need to be indicated to the victim UE, as shown on the left side of FIG. 3, while according to the first embodiment of the present disclosure, as shown on the right side of FIG. 3, only the interfering RBs overlapped with the victim RBs (i.e., the RBs represented by the areas filled with crossing lines) need to be indicated, which is like taking the bandwidth of the victim RBs as the "system bandwidth (SBW)" (i.e. virtual SBW) of the interfering RBs. It is obvious that bits may be saved since some interfering RBs do not need to be indicated. It is noted that when the allocation granularity of the victim RBs is smaller than that of the interfering RBs, if only part of an allocation unit (granularity) of the interfering RBs is overlapped with an allocation unit of the victim RBs, said allocation unit of the interfering RB is considered to be within the bandwidth of RBs allocated to the victim UE in the present disclosure. For example, if the allocation type of the victim RBs is type 2-D, and the allocation type of the interfering RBs is type 0, then the allocation unit of the victim RBs is one PRB with one slot, and the allocation unit of the interfering RBs is one RB pair group. In this case, even if only one PRB with one slot of the RB pair group of the interfering RBs in type 0 is overlapped with the PRB of the victim RBs in type 2-D, the RB pair group of the interfering RBs is considered to be within the bandwidth of RBs allocated to the victim UE.

Figure 4:
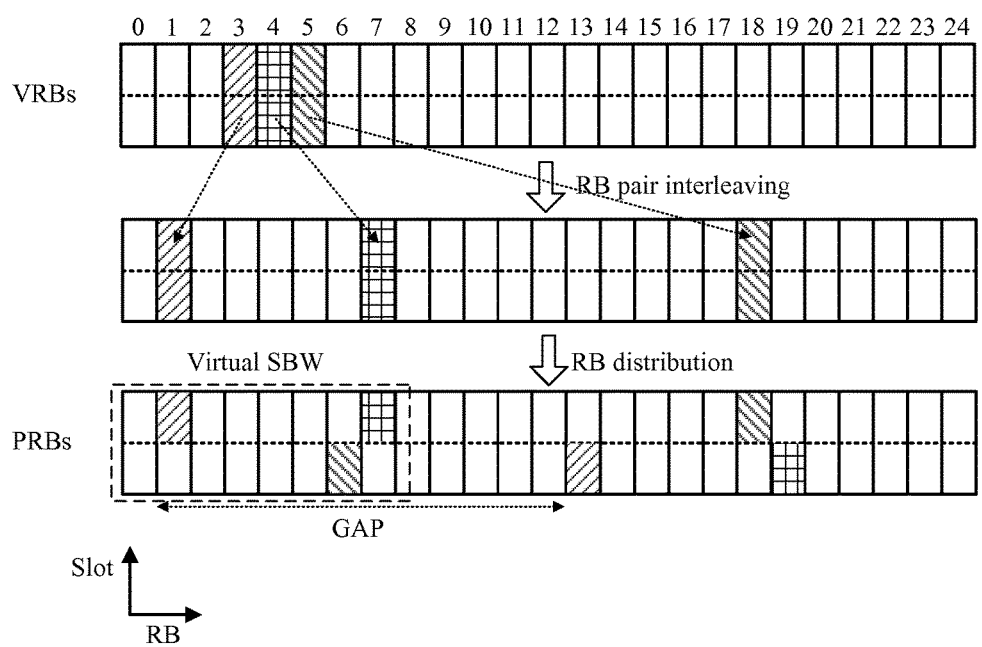
FIG. 4 schematically illustrates an example of VRB to PRB mapping in type 2-D.

It is known to those skilled in the art that for type 0, type 1, or type 2-L, the distribution pattern of physical RB (PRB) is the same as that of the virtual RB (VRB), and thus when the resource allocation type of the interfering UE is type 0, type 1, or type 2-L, it is possible to only indicate the interfering RBs within the bandwidth of RBs allocated to the victim UE. However, for type 2-D, there is RB redistribution when mapping VRBs to PRBs. FIG. 4 schematically shows an example of VRB to PRB mapping which depends on SBW and a gap value in type 2-D, in which the SBW is assumed to be 25 RBs, and the gap value (GAP) is 12. It is noted that the specific parameters or patterns are only exemplary, and not intended to limit the present disclosure. It can be derived from FIG. 4 that the PRBs could be distributed over the whole SBW corresponding to the interfering UE after RB pair interleaving and RB distribution even though the corresponding VRBs may be located within the virtual SBW. Therefore, when the resource allocation type of the interfering UE is type 2-D, the indication within the virtual SBW does not always apply. When and how the indication within the virtual SBW applies to type 2-D will be described later. Next, specific examples of the first embodiment will be described in detail.

In the first example of the first embodiment, for all the allocation types of the victim UE, the same allocation manner is used. Specifically, within the IRAI, a RB group (RBG)-based bitmap is used in the bandwidth of RBs allocated to the victim UE to indicate the interfering RB allocation of the interfering UE when the resource allocation type of the interfering UE is type 0, a mode of RBG-based bitmap plus RBG subset selection is used in the bandwidth of RBs allocated to the victim UE to indicate the interfering RB allocation of the interfering UE when the resource allocation type of the interfering UE is type 1, a continuous localized virtual RB (VRB) allocation is used in the bandwidth of RBs allocated to the victim UE to indicate the interfering RB allocation of the interfering UE when the resource allocation type of the interfering UE is type 2-L, and the allocation mode of type 2-D is used in the system bandwidth corresponding to the interfering UE to indicate the interfering RB allocation of the interfering UE when the resource allocation type of the interfering UE is type 2-D.

In the first example, the RBG-based bitmap means that 1 bit for each RB pair group is used to indicate whether said RB pair group is allocated, and the allocation unit of the RBG-based bitmap is a RB pair group. The mode of RBG-based bitmap plus RBG subset selection means that additional $\lceil \log_2 P \rceil$ bits are used for subset selection of RBG in addition to the bits used in the RBG-based bitmap wherein P is the number of RB pairs in a RBG, and the allocation unit of the RBG-based bitmap is a RB pair. It is noted that the mode of RBG-based bitmap plus RBG subset selection defined in the present disclosure is similar to the type 1 of the conventional resource allocation except that the mode of RBG-based bitmap plus RBG subset selection does not employ a shift indicator since every RBG within the virtual SBW needs to be indicated according to the present disclosure. The continuous localized virtual VRB allocation is similar to the type 2-L of the conventional resource allocation, in which the start RB pair and the length of the continuous RB pairs are indicated. However, it is noted that when the continuous localized virtual VRB allocation is used in the bandwidth of RBs allocated to the victim UE (i.e., in the virtual bandwidth), the RBs allocated to the victim UE are considered continuous in the frequency domain, and said length of the continuous RB pairs is the number of RB pairs occupied by the interfering RBs within the bandwidth of victim RBs. The allocation mode of type 2-D refers to a same allocation mode with the type 2-D of the conventional resource allocation, in which the start distributed VRB pair and the length of the continuous VRB pairs are indicated, and a gap value is also indicated when the SBW is larger than 49 RBs.

FIGS. 5-8 illustrate examples of the resource allocation for the victim UE and the interfering UE (interferer) in different allocation types for explaining the indication of the interference, in which the blocks filled with forward inclined lines represent the victim RBs (i.e., RBs allocated to the victim UE), and the blocks filled with backward inclined lines or crossing lines represent the interfering RBs (i.e., RBs allocated to the interfering UE) among which the blocks filled with crossing lines represent the interfering RBs within the bandwidth of the victim RBs (virtual SBW). In those examples, the SBW corresponding to the victim UE of the serving cell and the SBW corresponding to the interfering UE of the interfering cell are both 5 MHz (25 RBs).

Figure 5:
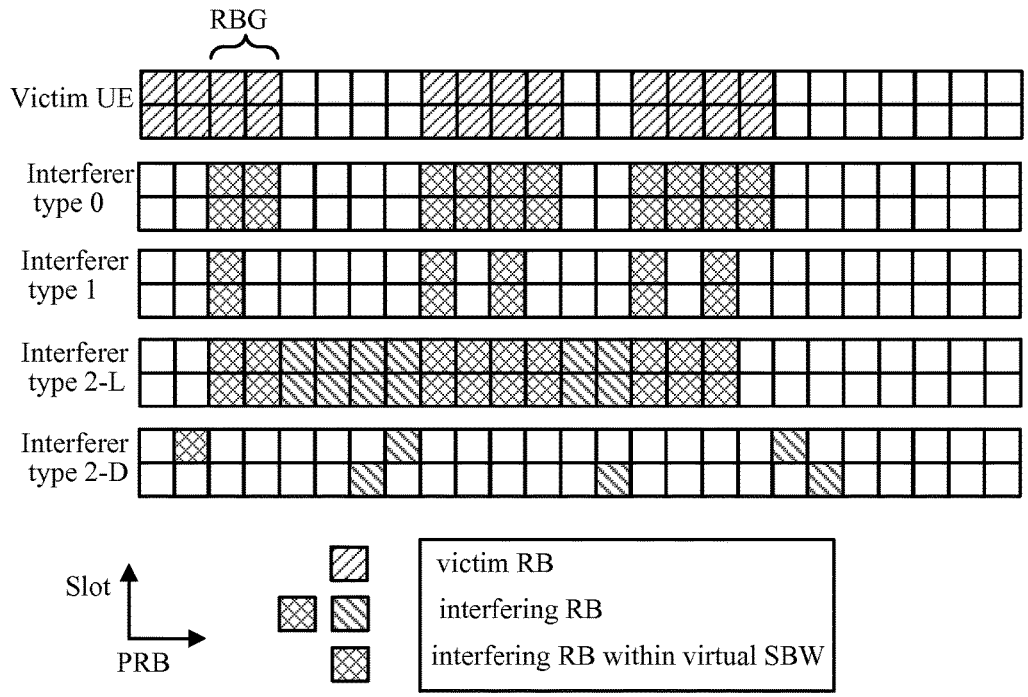
FIG. 5 illustrates an example of the resource allocation for the victim UE in type 0, and the resource allocation of the interferer in type 0, type 1, type 2-L and type 2-D.

FIG. 5 illustrates an example of the resource allocation for the victim UE in type 0, and the resource allocation for the interferer in type 0, type 1, type 2-L, and type 2-D, wherein 12 RBs or 6 RBGs are allocated in the PDSCH for the victim UE. In order to indicate the interfering RBs, according to the prior art, all the interfering RBs in the whole SBW of the interferers need to be indicated. In particular, for the interferer of type 0, the number of bits needed to indicate the interference equals $N_{RBG}^{DL}=13$, wherein $N_{RBG}^{DL}$ represents the number of RBGs in the whole SBW of the interfering UE; for the interferer of type 1, the number of bits needed to indicate the interference is 13 which is corresponding to the type 0; for the interferer of type 2-L, the number of bits needed to indicate the interference equals $$\left\lceil \log_2 \left( \frac{N_{RB}^{DL}(N_{RB}^{DL}+1)}{2} \right) \right\rceil = 9,$$

wherein $N_{RB}^{DL}$ represents the number of RBs in the whole SBW of the interfering UE, which is 25 in the example of FIG. 5; and for the interferer of type 2-D, the number of bits needed to indicate the interference is also $$\left\lceil \log_2 \left( \frac{N_{RB}^{DL}(N_{RB}^{DL}+1)}{2} \right) \right\rceil = 9.$$

In addition, according to the prior art, the section in the DCI for indicating the resource allocation (also referred to as resource allocation section in the following) is padded to have the same size for different allocation types of interferers, and thus the size of the resource allocation section will be the largest size among the different allocation types of interferers (type 0 and type 1 in this case). Further, 2 additional bits are needed to indicate the allocation types of the interferers. Therefore, the total number of bits needed to indicate the interference according to the prior art is 13+2=15.

In contrast, according to the first example of the first embodiment, the respective allocation modes described above can be employed only in the virtual SBW of the interferers (i.e., within the bandwidth of victim RBs) for type 0, type 1, and type 2-L of the interferer, that is, for type 0, type 1, and type 2-L of the interferer, only interfering RBs within the bandwidth of victim RBs would be indicated in the IRAI. As shown in FIG. 5, only the interfering RBs represented by blocks filled with crossing lines would be indicated according to the present disclosure for type 0, type 1, and type 2-L of the interferer. In particular, for the interferer of type 0, the RBG-based bitmap is used in the bandwidth of victim RBs, and thus the number of bits needed to indicate the interference equals $N_{RBG}^{PDSCH}=6$ since only 6 RBGs are allocated for the victim UE, wherein $N_{RBG}^{PDSCH}$ represents the number of RBGs within the bandwidth of victim RBs; for the interferer of type 1, the mode of RBG-based bitmap plus RBG subset selection is used in the bandwidth of victim RBs, and thus the number of bits needed to indicate the interference equals $N_{RBG}^{PDSCH}+\lceil \log_2 P \rceil=6+1=7$, wherein P represents the number of RBs within a RBG, and in this example is 2; for the interferer of type 2-L, the continuous localized VRB allocation is used in the bandwidth of victim RBs, and thus the number of bits needed to indicate the interference equals $$\left\lceil \log_2 \left( \frac{N_{RB}^{PDSCH}(N_{RB}^{PDSCH}+1)}{2} \right) \right\rceil = 7,$$

wherein $N_{RB}^{PDSCH}$ represents the number of RBs within the bandwidth of victim RBs, and in this example is 12; for the interferer of type 2-D, the allocation mode of type 2-D is used in the whole SBW of the interferers, and thus the number of bits needed to indicate the interference equals $$\left\lceil \log_2 \left( \frac{N_{RB}^{DL}(N_{RB}^{DL}+1)}{2} \right) \right\rceil = 9.$$

It is seen that the largest size of the IRAI for indicating the interference in this case according to the first example of the embodiment is 9 bits. Preferably, the size of the IRAI can be made to be the same for all configured resource allocation types of the interfering UE by padding in order to facilitate the detection of the receiver. In addition, the resource allocation type of the interfering UE can be indicated within the IRAI, and thus 2 additional bits are needed to indicate the 4 resource allocation types of the interferer. As a result, the total number of bits needed to indicate the interference according to the first example of the first embodiment would 9+2=11, and thus 4 bits are saved compared with the prior art.

Figure 6:
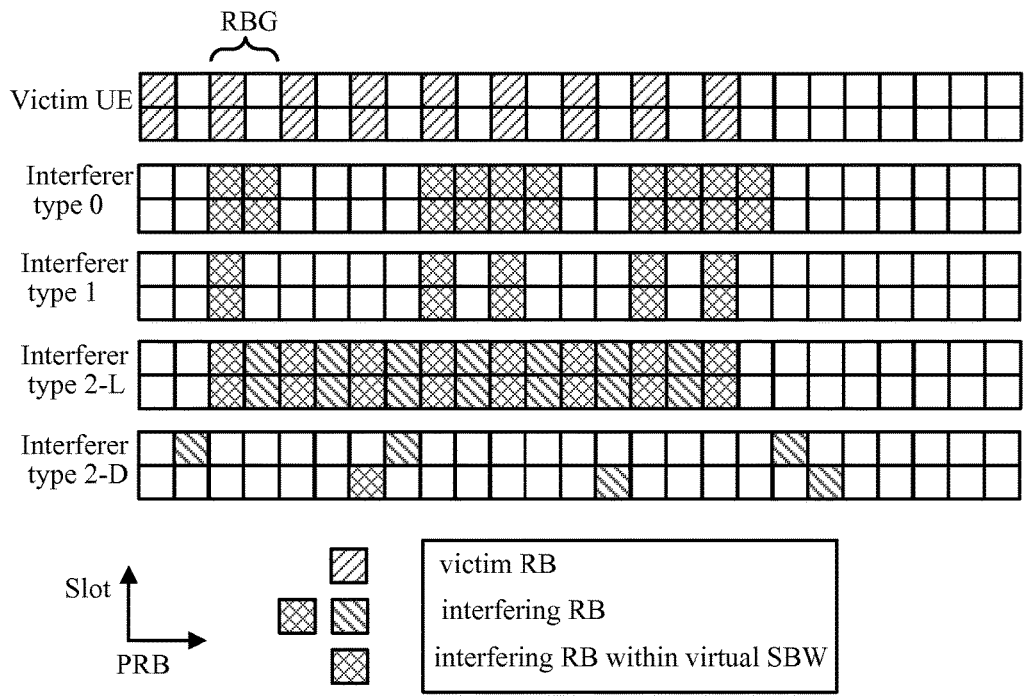
FIG. 6 illustrates an example of the resource allocation for the victim UE in type 1, and the resource allocation of the interferer in type 0, type 1, type 2-L and type 2-D.

FIG. 6 illustrates an example of the resource allocation for the victim UE in type 1, and the resource allocation of the interferer in type 0, type 1, type 2-L, and type 2-D, wherein 9 RBs are allocated in the PDSCH for the victim UE. Similar to the case of FIG. 5, according to the prior art, 15 bits are needed to indicate the interfering RBs. In contrast, according to the first example of the first embodiment, for the interferer of type 0, the RBG-based bitmap is used in the bandwidth of victim RBs, and thus the number of bits needed to indicate the interference equals $N_{RBG}^{PDSCH}=N_{RB}^{PDSCH}=9$; for the interferer of type 1, the mode of RBG-based bitmap plus RBG subset selection is used in the bandwidth of victim RBs, and thus the number of bits needed to indicate the interference equals $N_{RBG}^{PDSCH}+\lceil \log_2 P \rceil=9+1=10$; for the interferer of type 2-L, the continuous localized VRB allocation is used in the bandwidth of victim RBs, and thus the number of bits needed to indicate the interference equals $$\left\lceil \log_2 \left( \frac{N_{RB}^{PDSCH}(N_{RB}^{PDSCH}+1)}{2} \right) \right\rceil = 6;$$

for the interferer of type 2-D, the allocation mode of type 2-D is used in the whole SBW of the interferers, and thus the number of bits needed to indicate the interference equals $$\left\lceil \log_2 \left( \frac{N_{RB}^{DL}(N_{RB}^{DL}+1)}{2} \right) \right\rceil = 9.$$

It is seen that the largest size of the IRAI for indicating the interference in this case according to the first example of the embodiment is 10 bits. Preferably, the size of the IRAI can also be made to be the same for all configured resource allocation types of the interfering UE by padding in order to facilitate the detection of the receiver. In addition, the resource allocation type of the interfering UE can also be indicated within the IRAI, and thus 2 additional bits are needed to indicate the 4 resource allocation types of the interferer. As a result, the total number of bits needed to indicate the interference according to the first example of the first embodiment is 10+2=12, and thus 3 bits are saved compared with the prior art.

Figure 7:
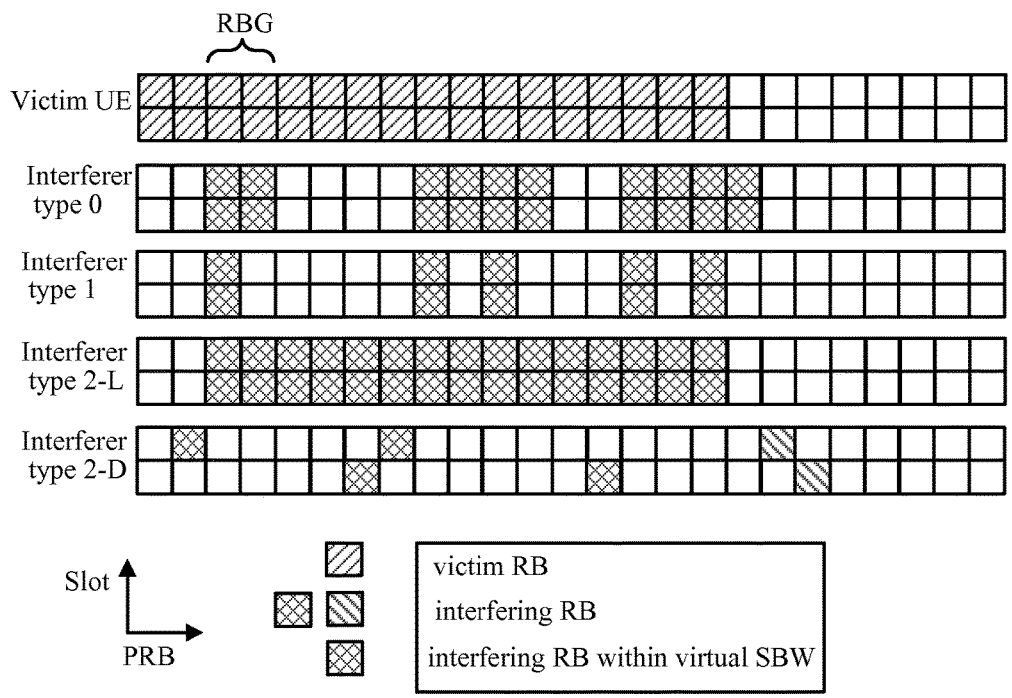
FIG. 7 illustrates an example of the resource allocation for the victim UE in type 2-L, and the resource allocation of the interferer in type 0, type 1, type 2-L and type 2-D.

FIG. 7 illustrates an example of the resource allocation for the victim UE in type 2-L, and the resource allocation of the interferer in type 0, type 1, type 2-L, and type 2-D, wherein 17 RBs are allocated in the PDSCH for the victim UE. Similar to the case of FIG. 5, according to the prior art, 15 bits are needed to indicate the interfering RBs. In contrast, according to the first example of the first embodiment, for the interferer of type 0, the RBG-based bitmap is used in the bandwidth of victim RBs, and thus the number of bits needed to indicate the interference equals $N_{RBG}^{PDSCH}=9$; for the interferer of type 1, the mode of RBG-based bitmap plus RBG subset selection is used in the bandwidth of victim RBs, and thus the number of bits needed to indicate the interference equals $N_{RBG}^{PDSCH}+\lceil \log_2 P \rceil=9+1=10$; for the interferer of type 2-L, the continuous localized VRB allocation is used in the bandwidth of victim RBs, and thus the number of bits needed to indicate the interference equals $$\left\lceil \log_2 \left( \frac{N_{RB}^{PDSCH}(N_{RB}^{PDSCH}+1)}{2} \right) \right\rceil = 8;$$

for the interferer of type 2-D, the allocation mode of type 2-D is used in the whole SBW of the interferers, and thus the number of bits needed to indicate the interference equals $$\left\lceil \log_2 \left( \frac{N_{RB}^{DL}(N_{RB}^{DL}+1)}{2} \right) \right\rceil = 9.$$

It is seen that the largest size of the IRAI for indicating the interference in this case according to the first example of the embodiment is 10 bits. Preferably the size of the IRAI can also be made to be the same for all configured resource allocation types of the interfering UE by padding in order to facilitate the detection of the receiver. In addition, the resource allocation type of the interfering UE can also be indicated within the IRAI, and thus 2 additional bits are needed to indicate the 4 resource allocation types of the interferer. As a result, the total number of bits needed to indicate the interference according to the first example of the first embodiment is 10+2=12, and thus 3 bits are saved compared with the prior art.

Figure 8:
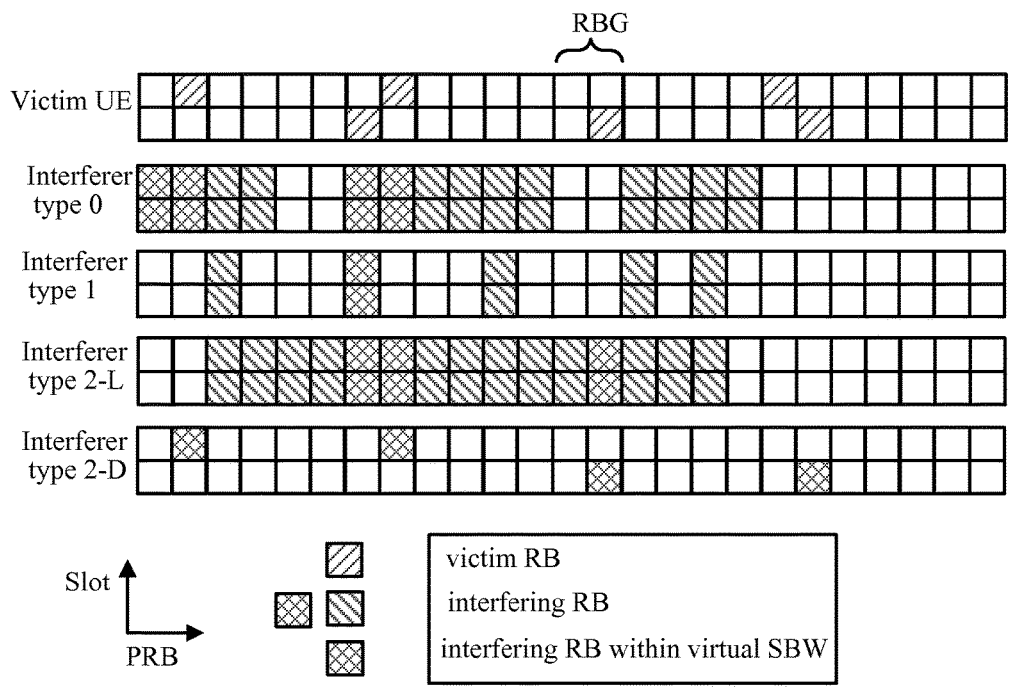
FIG. 8 illustrates an example of the resource allocation for the victim UE in type 2-D, and the resource allocation of the interferer in type 0, type 1, type 2-L and type 2-D.

FIG. 8 illustrates an example of the resource allocation for the victim UE in type 2-D, and the resource allocation of the interferer in type 0, type 1, type 2-L, and type 2-D, wherein 3 VRBs are allocated in the PDSCH for the victim UE, and after VRB to PRB mapping, the distribution of the PRB is obtained as shown in the upmost diagram of FIG. 8. It is noted that when calculating the number of RB pairs or RBGs which are allocated in respective equations in the present disclosure, if a RB pair or RBG is fully or partially allocated, then the RB pair or RBG is considered to be allocated. For example, for the case of FIG. 8, 4 RBGs and 6 RB pairs are allocated for victim UE. Similar to the case of FIG. 5, according to the prior art, 15 bits are needed to indicate the interfering RBs. In contrast, according to the first example of the first embodiment, for the interferer of type 0, the RBG-based bitmap is used in the bandwidth of victim RBs, and thus the number of bits needed to indicate the interference $N_{RBG}^{PDSCH}=4$; for the interferer of type 1, the mode of RBG-based bitmap plus RBG subset selection is used in the bandwidth of victim RBs, and thus the number of bits needed to indicate the interference equals $N_{RBG}^{PDSCH}+\lceil \log_2 P \rceil=4+1=5$; for the interferer of type 2-L, the continuous localized VRB allocation is used in the bandwidth of victim RBs, and thus the number of bits needed to indicate the interference equals $$\left\lceil \log_2\left(\frac{N_{RB}^{PDSCH}(N_{RB}^{PDSCH}+1)}{2}\right)\right\rceil=5;$$

for the interferer of type 2-D, the allocation mode of type 2-D is used in the whole SBW of the interferers, and thus the number of bits needed to indicate the interference equals $$\left\lceil \log_2\left(\frac{N_{RB}^{DL}(N_{RB}^{DL}+1)}{2}\right)\right\rceil=9.$$

It is seen that the largest size of the IRAI for indicating the interference in this case according to the first example of the embodiment is 9 bits. Preferably the size of the IRAI can also be made to be the same for all configured resource allocation types of the interfering UE by padding in order to facilitate the detection of the receiver. In addition, the resource allocation type of the interfering UE can also be indicated within the IRAI, and thus 2 additional bits are needed to indicate the 4 resource allocation types of the interferer. As a result, the total number of bits needed to indicate the interference according to the first example of the first embodiment is 9+2=11, and 4 bits are saved compared with the prior art.

It is noted that according to the first embodiment, the resource allocation type of the interfering UE can also be indicated in the DCI of the victim UE for allocating resource to the victim UE. In this case, the victim UE can know the allocation type of the interferer before detecting the IRAI, and thus the above-mentioned padding for the IRAI can be omitted, resulting in that more bits can be saved. Alternatively, the resource allocation type of the interfering UE can be signaled through RRC signaling. In this case, the victim UE can know the configured allocation type(s) of the interferer before detecting the IRAI. In conclusion, the resource allocation type of the interfering UE can be signaled from the serving eNB to the victim UE within the IRAI, within the DCI of the victim UE for allocating resource to the victim UE, or through RRC signaling.

In the first example of the first embodiment, the format of the IRAI is the same for all the resource allocation type of the victim UE. However, according to the first embodiment, the format of the IRAI can be determined based on the resource allocation type of the victim UE, that is, different formats of the IRAI can be used for different resource allocation types of the victim UE in order to further reduce the overhead. In the following, several examples according to this concept are described also with reference to FIGS. 5-8.

According to a second example of the first embodiment, if the resource allocation type of the victim UE is type 1, then within the IRAI, a RB pair-based bitmap in which 1 bit is used for each RB pair to indicate whether said RB pair is interfered by the interfering RB allocation of the interfering UE is employed in the bandwidth of RBs allocated to the victim UE when the resource allocation type of the interfering UE is type 0, type 1, or type 2-L, and the allocation mode of type 2-D is used in the system bandwidth corresponding to the interfering UE to indicate the interfering RB allocation of the interfering UE when the resource allocation type of the interfering UE is type 2-D. In the second example, if the resource allocation type of the victim UE is type 1, the resource allocation types of the interfering UE can be divided into two type groups for each of which the same resource indication mode is used in the IRAI to indicate the inference, wherein type 0, type 1, and type 2-L belong to a first group (or type "0" in Table 2), and type 2-D belongs to a second group (or type "1" in Table 2). Taking FIG. 6 as a specific example, for type 0, 1 and 2-L, 1 bit can be used for each RB pair within the bandwidth of victim RBs to indicate whether said RB pair is interfered by the RB allocation of the interfering UE, that is, a RB pair-based bitmap can be employed in the bandwidth of victim RBs, since the allocation granularity of the victim RBs (type 1) is equal to or smaller that of the interfering RBs (type 0, 1 or 2-L). Therefore, for type 0, 1 or 2-L of the interferer, the number of bits needed to indicate the interference would equal to $N_{RBG}^{PDSCH}=N_{RB}^{PDSCH}=9$ since the number of RBs allocated to the victim RB is 9 in FIG. 6. In addition, for the interferer of type 2-D, the allocation mode of type 2-D is used in the SBW of the interferer, and thus $$\left\lceil \log_2\left(\frac{N_{RB}^{DL}(N_{RB}^{DL}+1)}{2}\right)\right\rceil=9$$

bits is needed to indicate the interference.

It is seen that the largest size of the IRAI for indicating the interference according to the second example of the first embodiment is 9 bits. It is noted that although the size of the IRAI in the specific example is the same for the two type groups, it may not be the same in other cases. Preferably the size of the IRAI can be made to be the same for all configured resource allocation types of the interfering UE by padding in order to facilitate the detection of the receiver. In addition, the information (also referred to as type indicator in the present disclosure) on whether the resource allocation type of the interfering UE is any one of type 0, type 1 and type 2-L or type 2-D (i.e., which type group the resource allocation type of the interfering UE belongs) can also be indicated within the IRAI, and the information only needs 1 bit instead of 2 bits for it is not necessary to indicate all the 4 resource allocation types of the interferer. As a result, the total number of bits needed to indicate the interference according to the second example of the first embodiment is 9+1=10; therefore 5 bits are saved compared with the prior art, and 2 bits saved compared with the first example. Table 2 shows a comparison of the overhead between the prior art, the first example, and the second example.

TABLE 2 bit-length of RB allocation for different methods

| | Method | | | | | | | | | |
|---|---|---|---|---|---|---|---|---|---|---|
| | Prior Art | | | | First Example Type | | | | Second Example | |
| | 0 | 1 | 2L | 2D | 0 | 1 | 2L | 2D | "0" | "1" |
| Indication | 13 | 13 | 9 | 9 | 9 | 10 | 6 | 9 | 9 | 9 |
| Padding | 0 | 0 | 4 | 4 | 1 | 0 | 4 | 1 | 0 | 0 |
| Type Indicator | | 2 | | | | 2 | | | | 1 |
| Total | | 15 | | | | 12 | | | | 10 |

It is noted that according to the second embodiment, the information on whether the resource allocation type of the interfering UE is any one of type 0, type 1 and type 2-L or type 2-D can also be indicated in the DCI of the victim UE for allocating resource to the victim UE. In this case, the victim UE can know the information before detecting the IRAI, and thus the padding for the IRAI can be omitted, resulting in that more bits can be saved. Alternatively, the information on whether the resource allocation type of the interfering UE is any one of type 0, type 1 and type 2-L or type 2-D can be signaled through RRC signaling. In conclusion, the information on whether the resource allocation type of the interfering UE is any one of type 0, type 1 and type 2-L or type 2-D is signaled from the serving eNB to the victim UE within the IRAI, within the DCI of the victim UE for allocating resource to the victim UE, or through RRC signaling.

Alternatively or in addition, according to a third example of the first embodiment, if the resource allocation type of the victim UE is type 2-D, then within the IRAI, a RBG-based bitmap is used in the bandwidth of RBs allocated to the victim UE to indicate the interfering RB allocation of the interfering UE when the resource allocation type of the interfering UE is type 0; a mode of RBG-based bitmap plus RBG subset selection is used in the bandwidth of RBs allocated to the victim UE to indicate the interfering RB allocation of the interfering UE when the resource allocation type of the interfering UE is type 1; a continuous localized virtual RB (VRB) allocation is used in the bandwidth of RBs allocated to the victim UE to indicate the interfering RB allocation of the interfering UE when the resource allocation type of the interfering UE is type 2-L; a continuous distributed VRB allocation is used in the bandwidth of RBs allocated to the victim UE to indicate the interfering RB allocation of the interfering UE when the resource allocation type of the interfering UE is type 2-D, the system bandwidth corresponding to the victim UE is the same as that corresponding to the interfering UE, and the RB gap for the victim UE is the same as that for the interfering UE; and the allocation mode of type 2-D is used in the system bandwidth corresponding to the interfering UE to indicate the interfering RB allocation of the interfering UE when the resource allocation type of the interfering UE is type 2-D, and the system bandwidth corresponding to the victim UE is different from that corresponding to the interfering UE or the RB gap for the victim UE is different from that for the interfering UE.

In the third example, the resource indication of interferer for the type 0, 1, and 2-L of the interferer is the same as that in the first example of the first embodiment. In addition, when the resource allocation type of the interfering UE is type 2-D, but the system bandwidth corresponding to the victim UE is different from that corresponding to the interfering UE or the RB gap for the victim UE is different from that for the interfering UE, the VRB to PRB mapping for the victim UE and the interfering UE would be different, and therefore even though the distribution of the VRB is the same for the victim UE and the interfering UE, the distribution of the PRB would be different for the victim UE and the interfering UE. In this connection, the allocation mode of type 2-D is used in the system bandwidth corresponding to the interfering UE to indicate the interfering RB allocation of the interfering UE. The allocation mode of type 2-D is the same as that in the first example of the first embodiment.

However, in the third example, when the system bandwidth corresponding to the victim UE is the same as that corresponding to the interfering UE, and the RB gap for the victim UE is the same as that for the interfering UE in the case that the resource allocation type of both the victim UE and the interfering UE is type 2-D, the VRB to PRB mapping for the victim UE and the interfering UE would be the same. In other words, if the distribution of the VRB is the same for the victim UE and the interfering UE, the distribution of the PRB would be the same for the victim UE and the interfering UE.

Therefore, in this case, interfering VRBs within the victim VRBs can be reported to indicate the interference. In particular, a continuous distributed VRB allocation can be used in the bandwidth of RBs allocated to the victim UE to indicate the interfering RB allocation of the interfering UE. Herein, the continuous distributed VRB allocation is similar to the allocation mode of type 2 except that in the continuous distributed VRB allocation defined herein, it is not necessary to indicate the gap value. It is only necessary to indicate the start VRB and the length of the continuous VRBs. However, the gap value can also be indicated in the continuous distributed VRB allocation, but not necessarily. Whether the VRB to PRB mapping mode for the victim UE and the interfering UE is the same can be indicated in various ways, such as by RRC signaling.

Taking FIG. 8 as a specific example to explain the third example, for the interferer of type 0, 1 and 2-L, the resource indication of interferer is the same as that in the first example of the first embodiment, and thus details thereof are omitted here. For type 2-D of the interferer, since the bandwidth of the victim UE and the interfering UE is both 25 RBs which is small than 49 RBs, their gap value is the same. Therefore, the continuous distributed VRB allocation can be used in the bandwidth of victim RBs to indicate the interfering RB allocation of the interfering UE. The number of bits needed to indicate the interference would be $$\left\lceil \log_2\left(\frac{N_{VRB}^{PDSCH}(N_{VRB}^{PDSCH}+1)}{2}\right) \right\rceil = 3,$$

wherein $N_{VRB}^{PDSCH}$ represents the number of VRB pairs within the bandwidth of victim RBs.

It is seen that, according to the third example of the first embodiment, the number of bits used for the interferer of type 2-D is reduced by 6 bits. Similar to the first example, the size of the IRAI can also be made to be the same for all configured resource allocation types of the interfering UE by padding in order to facilitate the detection of the receiver. In addition, the resource allocation type of the interfering UE can also be indicated within the IRAI, and thus 2 additional bits are needed to indicate the 4 resource allocation types of the interferer. Table 3 shows a comparison of the overhead between the prior art (background), the first example, and the third example.

The total number of bits needed to indicate the interference according to the third example of the first embodiment can be only 7.

TABLE 3 bit-length of RB allocation for different methods

| | Method | | | | | | | | | | | |
|---|---|---|---|---|---|---|---|---|---|---|---|---|
| | Prior Art | | | | First Example Type | | | | Third Example | | | |
| | 0 | 1 | 2L | 2D | 0 | 1 | 2L | 2D | 0 | 1 | 2L | 2D |
| Indication | 13 | 13 | 9 | 9 | 4 | 5 | 5 | 9 | 4 | 5 | 5 | 3 |
| Padding | 0 | 0 | 4 | 4 | 5 | 4 | 4 | 0 | 1 | 0 | 0 | 2 |
| Type Indicator | | 2 | | | | 2 | | | | 2 | | |
| Total | | 15 | | | | 11 | | | | 7 | | |

In addition, similarly, the resource allocation type of the interfering UE can be signaled from the serving eNB to the victim UE within the IRAI, within the DCI of the victim UE for allocating resource to the victim UE, or through RRC signaling.

In the third example of the first embodiment, when the resource allocation type of the interfering UE is type 2-D, and the system bandwidth corresponding to the victim UE is different from that corresponding to the interfering UE or the RB gap for the victim UE is different from that for the interfering UE (i.e., the VRB to PRB mapping is different for the victim UE and the interfering UE), the resource indication in the third example is the completely same as the that in the first example, which will not be described in detail again.

It is noted that the second example and the third example can be employed individually or in combination. For example, when they are employed in combination, the second example is employed in the case that the resource allocation type of the victim UE is type 1, and the third example is employed in the case that the resource allocation type of the victim UE is type 2-D. In addition, if the resource allocation type of the victim UE is type 0 or type 2-L, any suitable indication mode can be used, for example, the indication mode in the first embodiment.

According to the first embodiment, the format of the IRAI can also be determined based on the number of RBs allocated to the victim UE. For example, when the number of victim RBs is smaller than a certain value, it may be more efficient to use a RB-based bitmap to indicate the interference than other methods such as those described in the first, second, or third examples of the first embodiment. In particular, in a fourth example of the first embodiment, a RB-based bitmap in which 1 bit is used for each RB to indicate whether said RB is interfered by the RB allocation of the interfering UE can be employed for the bandwidth of RBs allocated to the victim UE in the IRAI if the number of RBs allocated to the victim UE is smaller than a threshold, wherein the threshold is defined such that the total overhead for the IRAI with the RB-based bitmap is smaller than the total overhead for the IRAI with a selected format other than the RB-based bitmap when the number of RBs allocated to the victim UE is smaller than the threshold. It is noted that the "RB" in the "RB-based bitmap" here means a single RB with only one slot since the type 2-D is supported. If in some cases, the type 2-D may not need to be supported, e.g., none of the victim UE and interferer UE is configured with the resource allocation of type 2-D, then the "RB-based bitmap" could be replaced with "RB pair-based bitmap" in which 1 bit is used for each RB pair to indicate whether said RB pair is interfered by the RB allocation of the interfering UE.

When using a RB-based bitmap or RB pair-based bitmap to indicate the interference within the bandwidth of the victim RBs, the number of bits (overhead) needed to indicate the interference $N_{oh}^{bitmap}$ would be $2 N_{VRB}^{PDSCH}$ (when the allocation type is not type 2-D, $N_{VRB}^{PDSCH}$ equals $N_{RB}^{PDSCH}$) if type 2-D is supported (for example, the first $N_{VRB}^{PDSCH}$ bits among the $2 N_{VRB}^{PDSCH}$ bits can be used to indicate the RBs in the first slot, and the second $N_{VRB}^{PDSCH}$ bits can be used to indicate the RBs in the second slot; alternatively, every two continuous bits among the $2 N_{VRB}^{PDSCH}$ bits can be used to indicate the two slots in one RB pair respectively), and $N_{RB}^{PDSCH}$ if type 2-D is not supported. When using other methods to indicate the interference, the respective number of bits can also be easily calculated to those skilled in the art. For example, if the indication mode of the first, second or third example of the first embodiment is employed as said selected format other than the RB-based bitmap, the calculation method of the overhead has been described in the above. In general, if the padding is used and the type indicator is transmitted through L1 signaling, then the overhead for those indication methods can be expressed as follows:

$$N_{oh}^{other} = \max(N_{bit}^{type0}, N_{bit}^{type1}, N_{bit}^{type2-L}, N_{bit}^{type2-D}) + \lceil \log_2 N_{type} \rceil$$

where $N_{bit}^{type0}$, $N_{bit}^{type1}$, $N_{bit}^{type2-L}$, $N_{bit}^{type2-D}$ are the number of bits used to indicate interference in different allocation types of the interferer respectively, and $N_{type}$ is the number of allocation types of the interferer.

The threshold can be calculated from $N_{oh}^{bitmap} = N_{oh}^{other}$. In the fourth example, when the number of the victim RBs is smaller than the threshold, then the RB-based bitmap within the bandwidth of the victim RBs is used.

Figure 9:
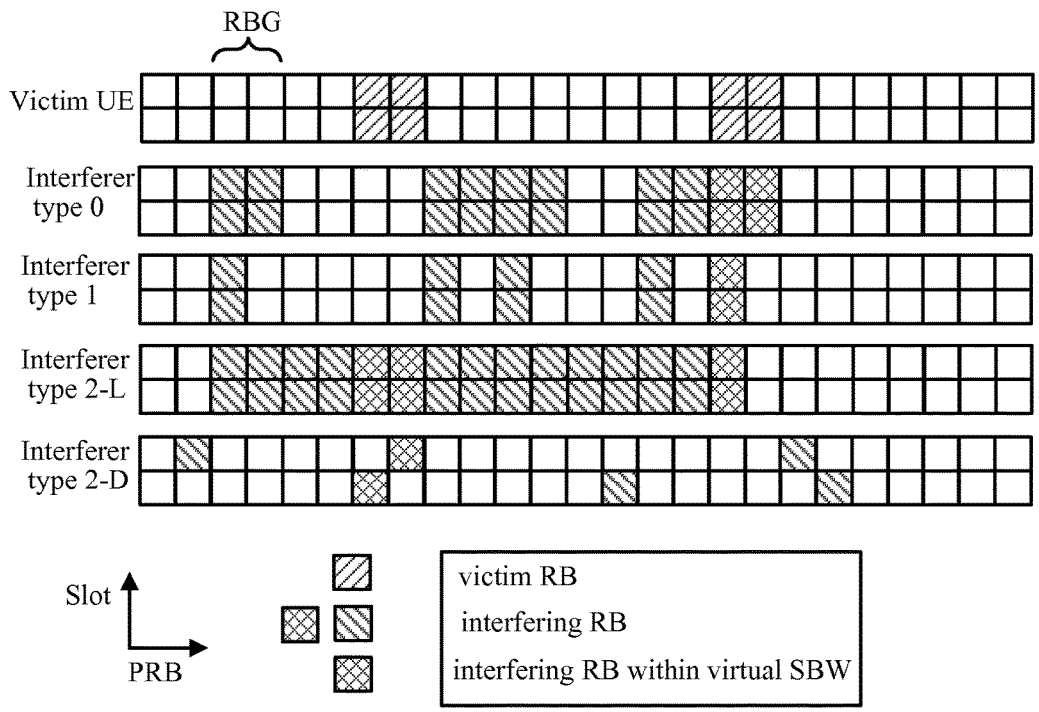
FIG. 9 illustrates another example of the resource allocation for the victim UE in type 0, and the resource allocation of the interferer in type 0, type 1, type 2-L and type 2-D.

Next, a specific example is described with reference to FIG. 9. FIG. 9 illustrates an example of the resource allocation for the victim UE in type 0, and the resource allocation of the interferer in type 0, type 1, type 2-L, and type 2-D, wherein the SBW corresponding to the victim UE and the SBW corresponding to the interfering UE are both 5 MHz (25 RBs), and 4 RBs (2 RBGs) are allocated to victim UE. In this specific example, the interference indication mode according to the first example of the first embodiment is employed as said selected format other than the RB-based bitmap. In this case, the threshold of victim RB number is 5 RB pairs under the circumstance that type 2-D is supported according to equation $N_{oh}^{bitmap} = N_{oh}^{other}$. Therefore, according to the fourth embodiment, the RB-based bitmap should be used, and the overhead for the RG-based bitmap would be $2 N_{VRB}^{PDSCH} = 8$ bits, while the overhead would be 11 bits if the first example is used. Table 4 shows a comparison of the overhead between the prior art, the first example, and the fourth example.

TABLE 4 bit-length of RB allocation for different methods

| | Method | | | | | | | | |
|---|---|---|---|---|---|---|---|---|---|
| | Prior Art | | | | First example | | | | Fourth Example |
| | Type | | | | | | | | |
| | 0 | 1 | 2L | 2D | 0 | 1 | 2L | 2D | RB-based Bitmap |
| Indication | 13 | 13 | 9 | 9 | 2 | 3 | 4 | 9 | 8 |
| Padding | 0 | 0 | 4 | 4 | 7 | 6 | 5 | 0 | 0 |
| Type Indicator | 2 | | | | 2 | | | | 0 |
| Total | 15 | | | | 11 | | | | 8 |

Figure 10:
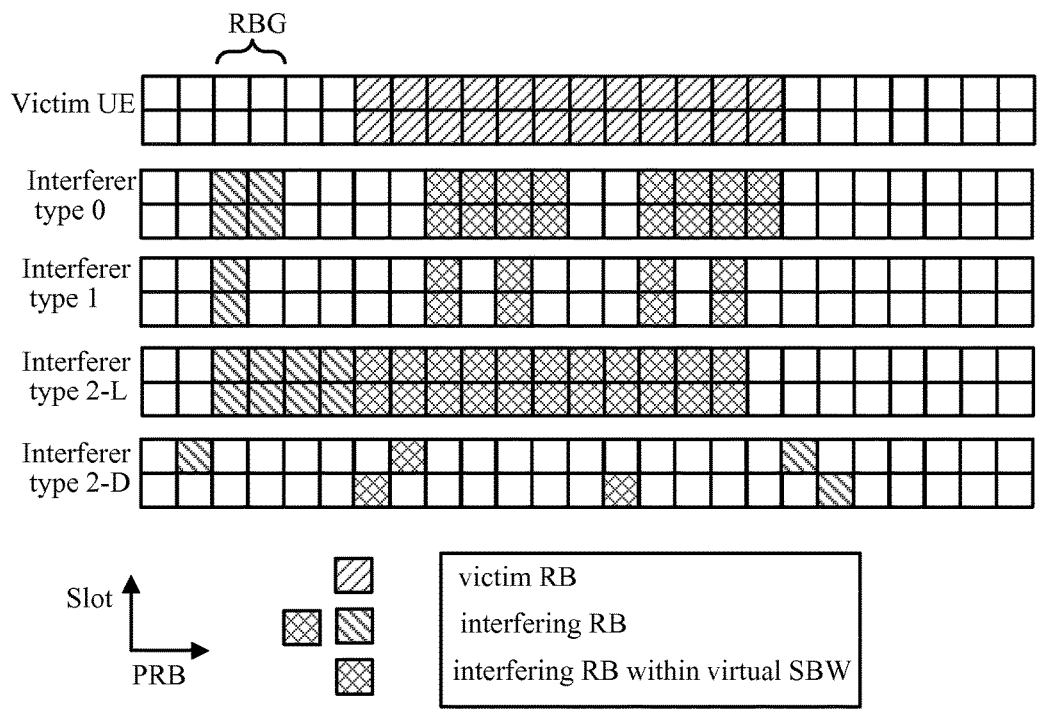
FIG. 10 illustrates another example of the resource allocation for the victim UE in type 2-L, and the resource allocation of the interferer in type 0, type 1, type 2-L and type 2-D.

Next, another specific example is described with reference to FIG. 10. FIG. 10 illustrates an example of the resource allocation for the victim UE in type 2-L, and the resource allocation of the interferer in type 0, type 1, type 2-L, and type 2-D, wherein the SBW corresponding to the victim UE and the SBW corresponding to the interfering UE are both 5 MHz (25 RBs), and 12 RBs (6 RBGs) are allocated to victim UE. In this specific example, the indication mode according to the first example of the first embodiment is employed as said selected format other than the RB-based bitmap. In this case, the threshold of victim RB number is 5 RB pairs under the circumstance that type 2-D is supported according to equation $N_{oh}^{bitmap}=N_{oh}^{other}$. Therefore, according to the fourth embodiment, the indication mode according to the first example should be used since the overhead for the RG-based bitmap would be 2 $N_{VRB}^{PDSCH}$=24 bits, while the overhead would be 11 bits if the first example is used. Table 5 shows a comparison of the overhead between the prior art, the first example, and the fourth example.

TABLE 5 bit-length of RB allocation for different methods

| | Method | | | | | | | |
|---|---|---|---|---|---|---|---|---|
| | Prior Art | | | | First Example | | | | Second Example |
| | Type | | | | | | | |
| | 0 | 1 | 2L | 2D | 0 | 1 | 2L | 2D | |
| Indication | 13 | 13 | 9 | 9 | 6 | 7 | 7 | 9 | Same as First Example |
| Padding | 0 | 0 | 4 | 4 | 3 | 2 | 2 | 0 | |
| Type Indicator | 2 | | | | 2 | | | | 2 |
| Total | 15 | | | | 11 | | | | 11 |

The fourth example can also be employed in combination with the concept of the second and third example, that is, the format of the IRAI can be determined based on both the resource allocation type of the victim UE and the number of RBs allocated to the victim UE.

Figure 11:
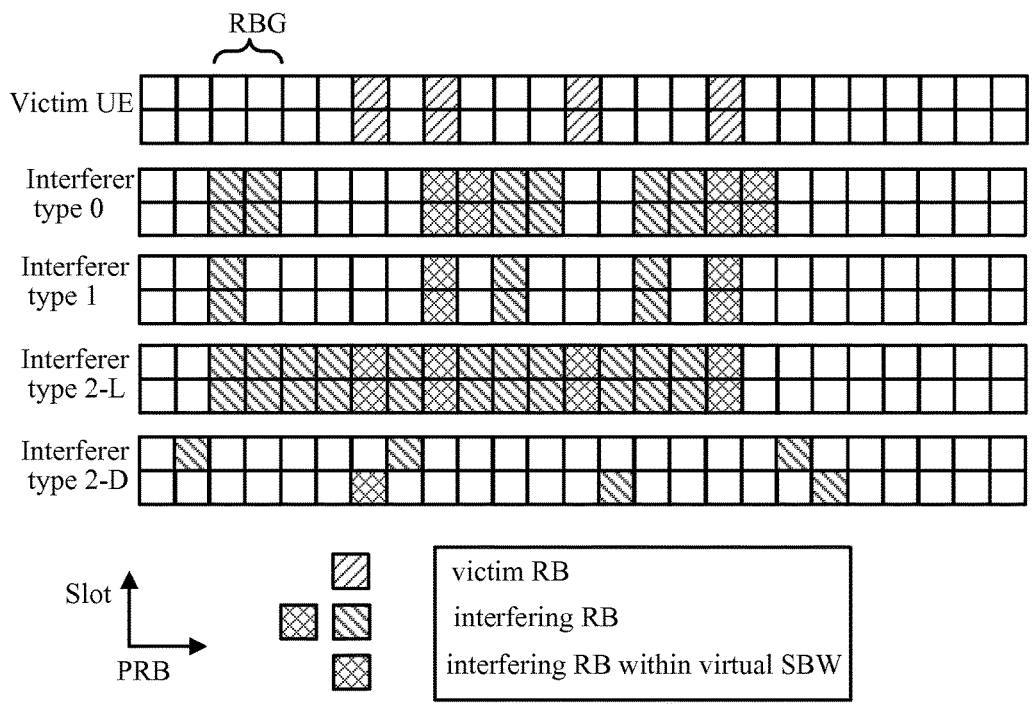
FIG. 11 illustrates another example of the resource allocation for the victim UE in type 1, and the resource allocation of the interferer in type 0, type 1, type 2-L and type 2-D.

A specific example is described with reference to FIG. 11 to explain the above concept. FIG. 11 illustrates an example of the resource allocation for the victim UE in type 1, and the resource allocation of the interferer in type 0, type 1, type 2-L, and type 2-D, wherein the SBW corresponding to the victim UE and the SBW corresponding to the interfering UE are both 5 MHz (25 RBs), and 4 RBs are allocated to victim UE. In this specific example, the indication mode according to the second example of the first embodiment is employed as said selected format other than the RB-based bitmap. In this case, the threshold of victim RB number is 5 RB pairs under the circumstance that type 2-D is supported according to equation $N_{oh}^{bitmap}=N_{oh}^{other}$. Therefore, according to the fourth embodiment, the RB-based bitmap should be used, and the overhead for the RG-based bitmap would be 2 $N_{VRB}^{PDSCH}$=8 bits, while the overhead would be 10 bits if the second example is used. Table 6 shows a comparison of the overhead between the prior art, the first example, the second example and the fourth example.

TABLE 6 bit-length of RB allocation for different methods

| | Method | | | | | | | | | | |
|---|---|---|---|---|---|---|---|---|---|---|---|
| | Prior Art | | | | First Example | | | | Second Example | | Fourth Example |
| | Type | | | | | | | | | | |
| | 0 | 1 | 2L | 2D | 0 | 1 | 2L | 2D | "0" | "1" | RB-based Bitmap |
| Indication | 13 | 13 | 9 | 9 | 2 | 3 | 4 | 9 | 4 | 9 | 8 |
| Padding | 0 | 0 | 4 | 4 | 7 | 6 | 5 | 0 | 5 | 0 | 0 |
| Type Indicator | 2 | | | | 2 | | | | 1 | | 0 |
| Total | 15 | | | | 11 | | | | 10 | | 8 |

Another specific example according the fourth example is described with reference to FIG. 8. FIG. 8 illustrates an example of the resource allocation for the victim UE in type 2-D, and the resource allocation of the interferer in type 0, type 1, type 2-L, and type 2-D, wherein the SBW corresponding to the victim UE and the SBW corresponding to the interfering UE are both 5 MHz (25 RBs), and 3 VRBs are allocated to victim UE. In this specific example, the indication mode according to the third example of the first embodiment is employed as said selected format other than the RB-based bitmap. In this case, the threshold of victim RB number is 5 VRB pairs according to equation $N_{oh}^{bitmap} = N_{oh}^{other}$. Therefore, according to the fourth embodiment, the RB-based bitmap should be used, and the overhead for the RB-based bitmap would be 2 $N_{VRB}^{PDSCH} = 6$ bits, while the overhead would be 7 bits if the third example is used. Table 7 shows a comparison of the overhead between the prior art, the first example, the third example and the fourth example.

TABLE 7 bit-length of RB allocation for different methods

| | Method | | | | | | | | | | | |
|---|---|---|---|---|---|---|---|---|---|---|---|---|
| | Prior Art | | | | First Example | | | | Third Example | | | Fourth Example |
| | Type | | | | | | | | | | | |
| | 0 | 1 | 2L | 2D | 0 | 1 | 2L | 2D | 0 | 1 | 2L | 2D | RB-based Bitmap |
| Indication | 13 | 13 | 9 | 9 | 4 | 5 | 5 | 9 | 4 | 5 | 5 | 3 | 6 |
| Padding | 0 | 0 | 4 | 4 | 5 | 4 | 4 | 0 | 1 | 0 | 0 | 2 | 0 |
| Type Indicator | | 2 | | | | 2 | | | | 2 | | | 0 |
| Total | | 15 | | | | 11 | | | | 7 | | | 6 |

In the above, the case that the type 2-D is supported has been described in detail. For the case that type 2-D is not supported, the method according to the fourth example of the first embodiment can be similarly applied except that the "RB-based bitmap" could be replaced with "RB pair-based bitmap".

In addition, in the first embodiment, the information on the RBs allocated to the victim UE can be signaled to the victim UE by RRC signaling. The allocation information includes the resource allocation type, the RB number, and/or the RB position. In this manner, the victim UE can know the allocation information through the RRC signaling rather than through the DCI of the victim UE; therefore, the IRAI or the interfering DCI incorporating the IRAI can be blind-detected independent on and parallel with the DCI of the victim UE.

Figure 12:
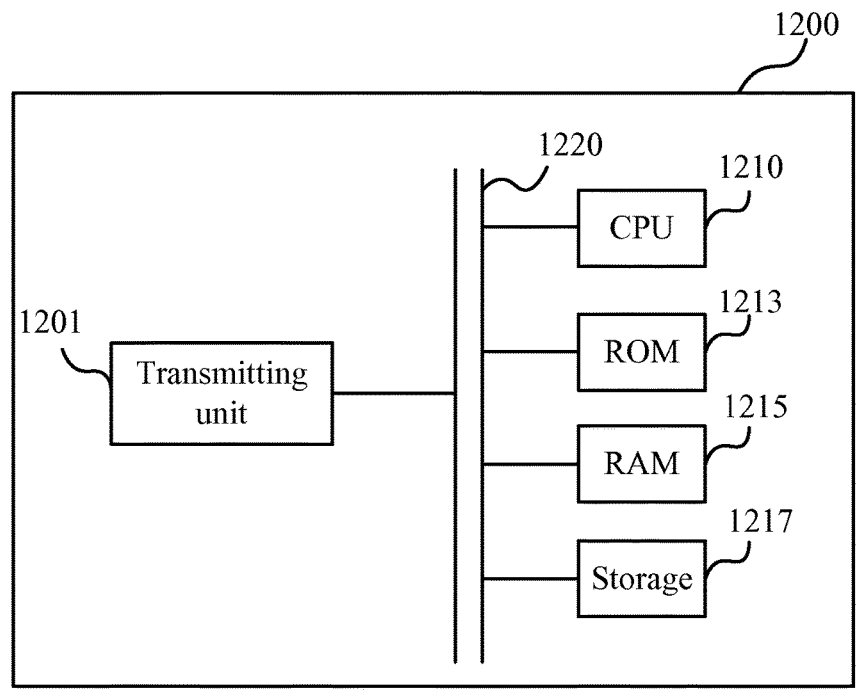
FIG. 12 is a block diagram illustrating an eNB according to the first embodiment of the present disclosure.

In the first embodiment, an eNB for performing the above method is provided. FIG. 12 is a block diagram illustrating an eNB 1200 according to the first embodiment of the present disclosure. The eNB 1200 is used for transmitting interfering resource allocation information (IRAI) of an interfering user equipment (UE) attached to an interfering cell to a victim UE attached to the eNB 1200. The eNB 1200 comprises a transmitting unit 1201. The transmitting unit 1201 can be configured to transmit the IRAI through L1 signaling to the victim UE, wherein the IRAI indicates only interfering resource block (RB) allocation within the bandwidth of RBs allocated to the victim UE at least in the case that the resource allocation type of the interfering UE is type 0, type 1, or type 2-L.

The eNB 1200 according to the present disclosure may optionally include a CPU (Central Processing Unit) 1210 for executing related programs to process various data and control operations of respective units in the eNB 1200, a ROM (Read Only Memory) 1213 for storing various programs required for performing various process and control by the CPU 1210, a RAM (Random Access Memory) 1215 for storing intermediate data temporarily produced in the procedure of process and control by the CPU 1210, and/or a storage unit 1217 for storing various programs, data and so on. The above transmitting unit 1201, CPU 1210, ROM 1213, RAM 1215 and/or storage unit 1217 etc. may be interconnected via data and/or command bus 1220 and transfer signals between one another.

Respective units as described above do not limit the scope of the present disclosure. According to one implementation of the disclosure, the functions of the above transmitting unit 1201 may be implemented by hardware, and the above CPU 1210, ROM 1213, RAM 1215 and/or storage unit 1217 may not be necessary. Alternatively, the functions of the above transmitting unit 1201 may also be implemented by functional software in combination with the above CPU 1210, ROM 1213, RAM 1215 and/or storage unit 1217 etc.

Figures 13, 14:
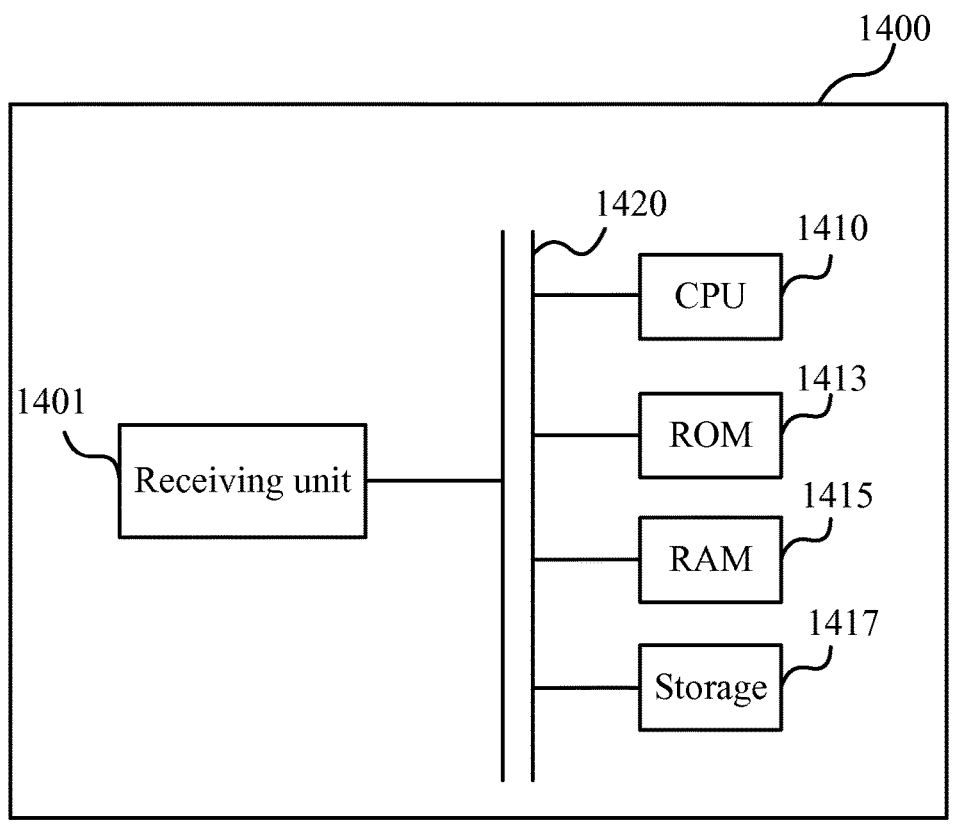
FIG. 13 illustrates a wireless communication method at UE side according to the first embodiment of the present disclosure.
FIG. 14 is a block diagram illustrating a UE according to the first embodiment of the present disclosure.

Accordingly, at UE side, the first embodiment can be implemented as wireless communication method 1300 as shown in FIG. 13. In particular, the method 1300 is a wireless communication method for receiving interfering resource allocation information (IRAI) of an interfering user equipment (UE) attached to an interfering cell by a victim UE from a serving eNode B (eNB) to which the victim UE is attached. The method 1300 comprising a step 1301 of receiving the IRAI transmitted through L1 signaling from the serving eNB to the victim UE, wherein the IRAI indicates only interfering resource block (RB) allocation within the bandwidth of RBs allocated to the victim UE at least in the case that the resource allocation type of the interfering UE is type 0, type 1, or type 2-L.

In addition, a UE for performing the above method is provided. FIG. 14 is a block diagram illustrating a UE 1400 according to the first embodiment of the present disclosure. The UE 1400 is used as a victim UE for receiving interfering resource allocation information (IRAI) of an interfering user equipment (UE) attached to an interfering cell from a serving eNode B (eNB) to which the victim UE is attached. The UE 1400 comprises a receiving unit 1401 which can be configured to receive the IRAI transmitted through L1 signaling from the serving eNB to the victim UE, wherein the IRAI indicates only interfering resource block (RB) allocation within the bandwidth of RBs allocated to the victim UE at least in the case that the resource allocation type of the interfering UE is type 0, type 1, or type 2-L.

The UE 1400 according to the present disclosure may optionally include a CPU (Central Processing Unit) 1410 for executing related programs to process various data and control operations of respective units in the UE 1400, a ROM (Read Only Memory) 1413 for storing various programs required for performing various process and control by the CPU 1410, a RAM (Random Access Memory) 1415 for storing intermediate data temporarily produced in the procedure of process and control by the CPU 1410, and/or a storage unit 1417 for storing various programs, data and so on. The above transmitting unit 1401, CPU 1410, ROM 1413, RAM 1415 and/or storage unit 1417 etc. may be interconnected via data and/or command bus 1420 and transfer signals between one another.

Respective units as described above do not limit the scope of the present disclosure. According to one implementation of the disclosure, the functions of the above receiving unit 1401 may be implemented by hardware, and the above CPU 1410, ROM 1413, RAM 1415 and/or storage unit 1417 may not be necessary. Alternatively, the functions of the above receiving unit 1401 may also be implemented by functional software in combination with the above CPU 1410, ROM 1413, RAM 1415 and/or storage unit 1417 etc.

Second Embodiment

Figure 15:
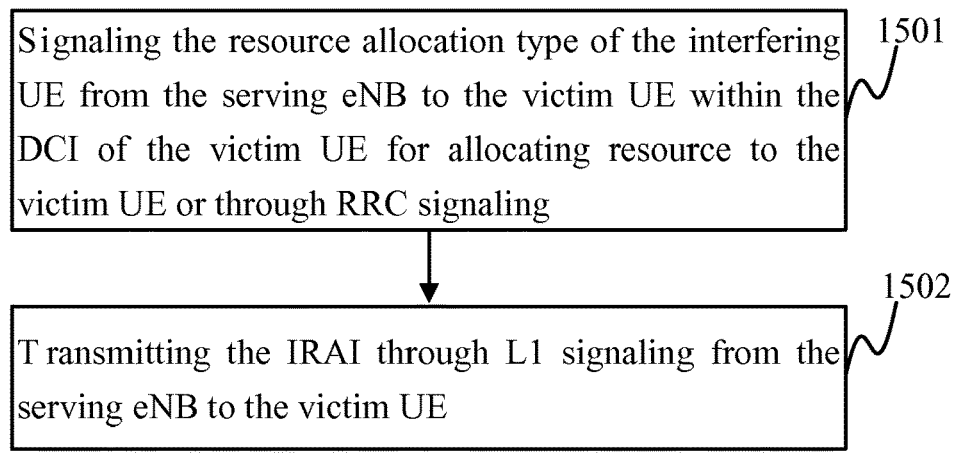
FIG. 15 illustrates a wireless communication method at eNB side according to a second embodiment of the present disclosure.

In the second embodiment of the present embodiment, there is provided a wireless communication method 1500 as shown in FIG. 15 for transmitting interfering resource allocation information (IRAI) of an interfering user equipment (UE) attached to an interfering cell by a serving eNode B (eNB) to a victim UE attached to the serving eNB. The method 1500 comprising a step 1501 of signaling the resource allocation type of the interfering UE from the serving eNB to the victim UE within the DCI of the victim UE for allocating resource to the victim UE or through RRC signaling, and a step 1502 of transmitting the IRAI through L1 signaling from the serving eNB to the victim UE.

In step 1501, the resource allocation type of the interfering UE can be signaled with a long term indication by RRC signaling, e.g., adding a new IE in RRC signaling to configure the currently supported allocation types of interferer. In this manner, the victim UE can know the supported allocation type(s) of interferer before detecting the IRAI, and some overhead can be saved. For example, if it is signaled that only types 0, 1, and 2-L of interferer are supported, then if the second example of the first embodiment is used in step 1502 to indicate the interference, for victim RBs of type 1, the RB pair-based bitmap without type indicator can always be used for the supported allocation types of interference. In addition, by step 1501, padding overhead can possibly be reduced since the allocation type which needs the most number of bits may not be supported by RRC signaling. Moreover, If it has been known that the type 2-D is not supported by RRC signaling, the RB-based bitmap can be used instead of the RB pair-based bitmap, which can reduce the overhead by half.

Alternatively or in addition, in step 1501, the resource allocation type of the interfering UE can be signaled within the DCI of the victim UE. This dynamic indication by the DCI of victim UE can be implemented by reusing the field in traditional DCI to indicate the resource allocation types of interferers or adding a new field in the traditional DCI for NAICS capable UE only. For example, the resource allocation type of interfering RBs can be explicitly indicated by reusing CIF field (3-bit) with the help of RRC configuration. By indicating the resource allocation type of the interfering UE within the DCI of the victim UE, padding can be avoided since the serving cell has indicated the current allocation type of the interferer. As examples, the type indicator in the DCI of the victim UE can be the following forms:

a) 1-bit indicator: for example a type 2-D indicator, e.g., "0"-type 2-D supported, "1"-type 2-D not-supported;

b) 2-bit indicator: for indicating a unique allocation type, e.g., "00"-type 0, "01"-type 1, "10"-type 2-L, "11"-type 2-D;

c) 3-bit indicator: for indicating set of supported types, e.g., type 0/1, type 2-L, and type 2-D each uses 1-bit indicator (e.g., "0": support, "1": not-support, then "000"-type 0/1/2-L/2-D, "001"-type 0/1/2-L, . . . ).

It is noted that the above forms for the type indicator are only examples, and are not intended to limit the present disclosure.

In addition, in step 1502, any format of the IRAI can be used, including but not limited to those described in the first embodiment. The details described in the first embodiment also apply to the second embodiment.

Figure 16:
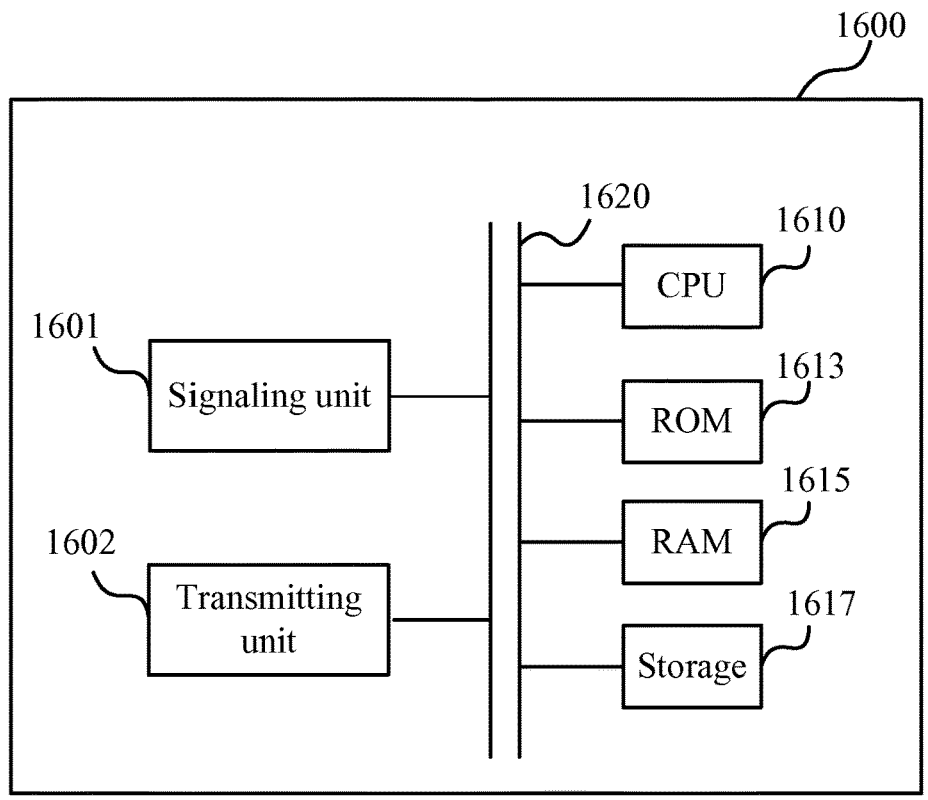
FIG. 16 is a block diagram illustrating an eNB according to the second embodiment of the present disclosure.

In the second embodiment, an eNB for performing the above method is provided. FIG. 16 is a block diagram illustrating an eNB 1600 according to the second embodiment of the present disclosure. The eNB 1600 is used for transmitting interfering resource allocation information (IRAI) of an interfering user equipment (UE) attached to an interfering cell to a victim UE attached to the eNB 1600. The eNB 1600 comprises a signaling unit 1601 and a transmitting unit 1602. The signaling unit 1601 can be configured to signal the resource allocation type of the interfering UE from the eNB to the victim UE within the downlink control information (DCI) of the victim UE for allocating resource to the victim UE or through RRC signaling, and the transmitting unit 1602 can be configured to transmit the IRAI through L1 signaling from the eNB to the victim UE. Similar to eNB 1200, the eNB 1600 may also comprise other units, and the description on the other units in eNB 1200 can also apply to eNB 1600.

Figure 17:
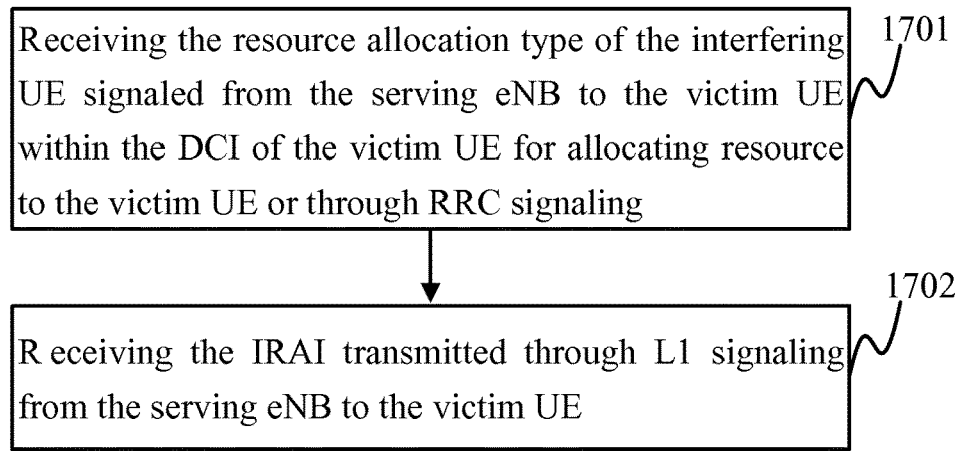
FIG. 17 illustrates a wireless communication method at UE side according to a second embodiment of the present disclosure.

Accordingly, at UE side, the second embodiment can be implemented as wireless communication method 1700 as shown in FIG. 17. In particular, the method 1700 is a wireless communication method for receiving interfering resource allocation information (IRAI) of an interfering user equipment (UE) attached to an interfering cell by a victim UE from a serving eNode B (eNB) to which the victim UE is attached. The method 1700 comprises a step 1701 of receiving the resource allocation type of the interfering UE signaled from the serving eNB to the victim UE within the downlink control information (DCI) of the victim UE for allocating resource to the victim UE or through RRC signaling, and a step 1702 of receiving the IRAI transmitted through L1 signaling from the serving eNB to the victim UE.

Figure 18:
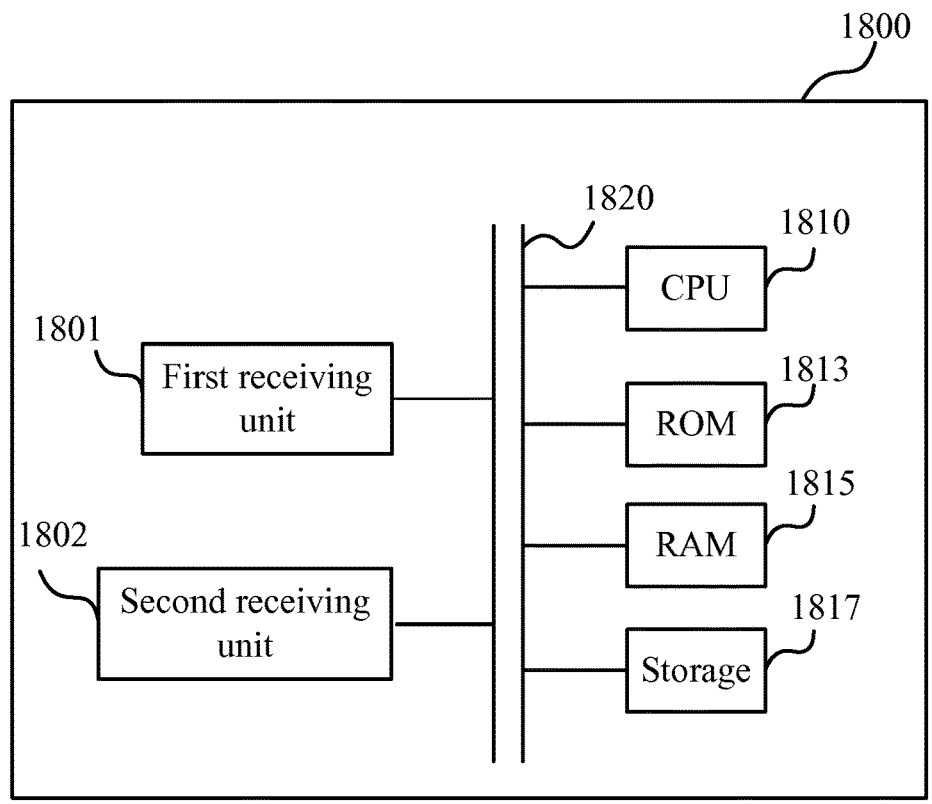
FIG. 18 is a block diagram illustrating a UE according to the second embodiment of the present disclosure.

In addition, a UE for performing the above method is provided. FIG. 18 is a block diagram illustrating a UE 1800 according to the second embodiment of the present disclosure. The UE 1800 is used as a victim UE for receiving interfering resource allocation information (IRAI) of an interfering user equipment (UE) attached to an interfering cell from a serving eNode B (eNB) to which the victim UE is attached. The UE 1800 comprises a first receiving unit 1801 which can be configured to receive the resource allocation type of the interfering UE signaled from the serving eNB to the victim UE within the downlink control information (DCI) of the victim UE for allocating resource to the victim UE or through RRC signaling, and a second receiving unit 1802 which can be configured to receive the IRAI transmitted through L1 signaling from the serving eNB to the victim UE. Similar to UE 1400, the UE 1800 may also comprise other units, and the description on the other units in UE 1400 can also apply to UE 1800.

Third Embodiment

The third embodiment refers to the interference indication of multiple interferers which are coming from a same cell. When the multiple interferers come from the same cell, the RB allocation of each interferer is mutually orthogonal. Therefore, if parts of the interferers have been indicated, the bandwidth used for indicating other interferers (virtual SBW) can be further reduced by excluding the RBs allocated to these interferers that have been indicated, that is, the indication mode of the IRAI for at least one interfering UE among the multiple interfering UEs can be determined depending on those interfering UEs whose IRAI has been indicated among the multiple interfering UEs. It is noted that interferers in MU-MIMO pair are considered as interferers from different cells.

Figures 19, 20:
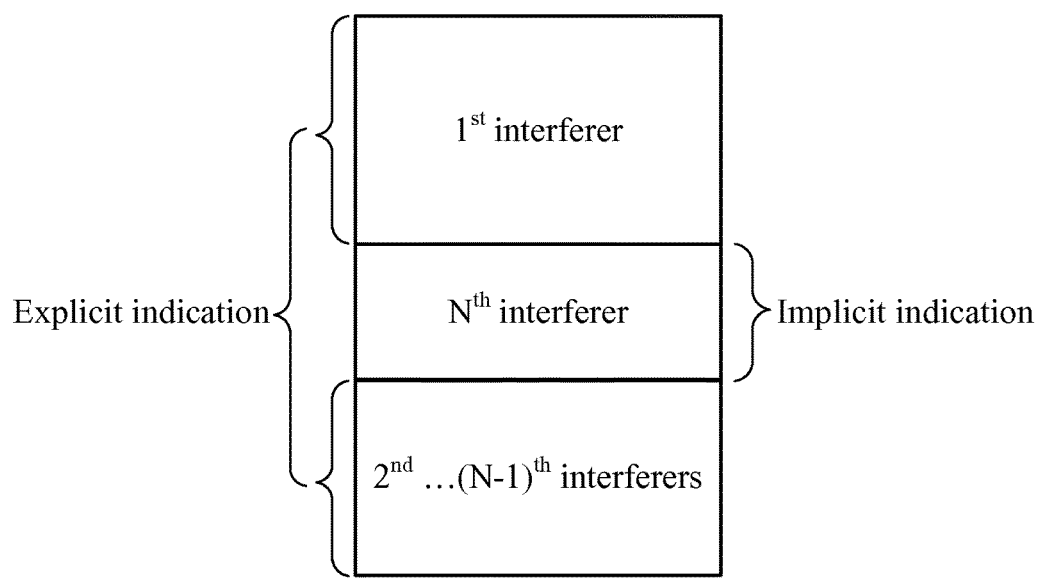
FIG. 19 illustrates a wireless communication method at eNB side according to a third embodiment of the present disclosure.
FIG. 20 illustrates a schematic diagram of the implicit indication of the last interfering UE according to the third embodiment of the present disclosure.

According to the third embodiment, there is provided a wireless communication method 1900 as shown in FIG. 19 for transmitting interfering resource allocation information (IRAI) of multiple interfering user equipments (UEs) attached to a same interfering cell by a serving eNode B (eNB) to a victim UE attached to the serving eNB, comprising a step 1901 of transmitting the IRAI of the multiple interfering UEs through L1 signaling from the serving eNB to the victim UE, wherein the indication mode of the IRAI for at least one interfering UE among the multiple interfering UEs is dependent on those interfering UEs whose IRAI has been indicated among the multiple interfering UEs.

In a first example of the third embodiment, the IRAI of a first interfering UE of the multiple interfering UEs is not explicitly transmitted to the victim UE, while the IRAI of the other interfering UEs among the multiple interfering UEs is explicitly transmitted to the victim UE, and the remaining resource blocks (RB) other than the RBs which have been allocated to the other interfering UEs within the system bandwidth of the interfering cell are implicitly indicated as being allocated to the first interfering UE. According to this example, assuming there are N interfering UEs in the interfering cell that need to be indicated, when N−1 interfering UEs among the N interfering UEs have been indicated, the $N^{th}$ interfering UE will not be indicated explicitly but the victim UE would regard the remaining RBs other than the RBs which have been allocated to the N−1 interfering UEs within the system bandwidth of the interfering cell as the RBs that are allocated to the $N^{th}$ interfering UE. FIG. 20 illustrates a schematic diagram of the implicit indication of the Nth interfering UE. In FIG. 20, the resource allocation of the $1^{st}$ to $(N-1)^{th}$ interferers is explicitly indicated, while the resource allocation of the $N^{th}$ interferer will not be explicitly indicated (i.e. the IRAI does not explicitly indicate the allocation information of the $N^{th}$ interferer), but the victim UE would regard the remaining RBs in the BSW of the interfering cell as being allocated to the $N^{th}$ interferer.

Preferably, the IRAI of the other interfering UEs (the N−1 interfering UEs) is indicated in a single interfering DCI. The interfering DCI can be a separate DCI for indicating interference such as described in Table 1. In addition, the maximum number of interfering UEs whose IRAI can be indicated can be signaled from the serving eNB to the victim UE through RRC signaling, and/or the current number of the multiple interfering UEs whose IRAI is currently to be indicated can be signaled from the serving eNB to the victim UE within the DCI of the victim UE, in order to facilitate the detection of the IRAI or the interfering DCI.

Figures 21, 22:
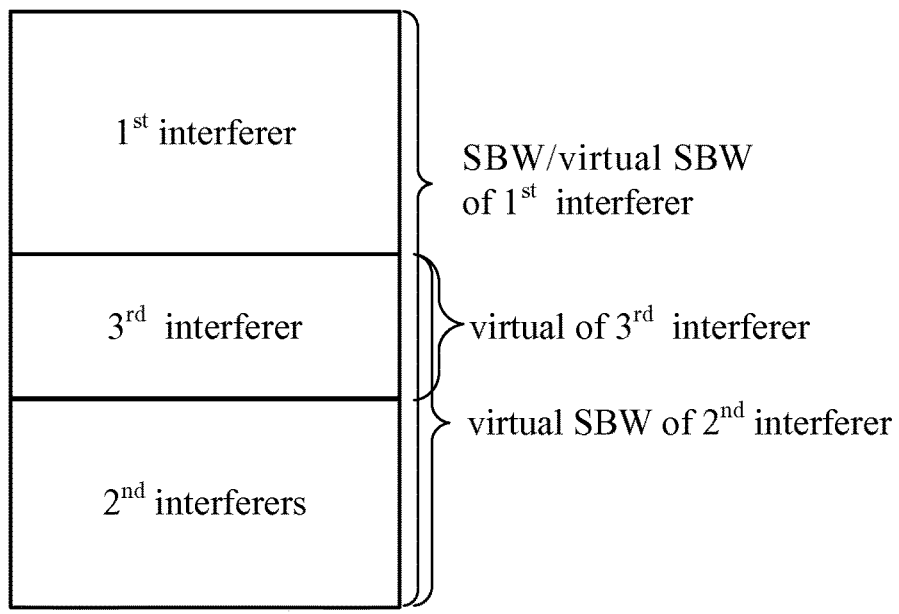
FIG. 21 illustrates a schematic diagram of reduction of the virtual SBW according to the third embodiment of the present disclosure.
FIG. 22 illustrates a wireless communication method at eNB side according to the third embodiment of the present disclosure.

In a second example of the third embodiment, the IRAI of a interfering UE among the multiple interfering UEs does not indicate interfering resource block (RB) allocation within the bandwidth of RBs which are allocated to interfering UEs whose IRAI has been transmitted to the victim UE among the multiple interfering UE. Since the RB allocation of the multiple interferers that come from the same cell is mutually orthogonal, the RBs which have been allocated to an interfering UE cannot be allocated to another interfering UE, and therefore, the bandwidth (virtual SBW) for indicating said another interfering UE can be reduced. FIG. 21 illustrates a schematic diagram of reduction of the virtual SBW according to the third embodiment. As shown in FIG. 21, after the $1^{st}$ interferer has been indicated, the virtual SBW for the $2^{nd}$ interferer is reduced by the RBs allocated to the $1^{st}$ interferer; and after the $2^{nd}$ interferer has been indicated, the virtual SBW for the $3^{rd}$ interferer is further reduced by the RBs allocated to the $2^{nd}$ interferer.

In addition, the third embodiment can be combined with the first and the second embodiment. For example, the IRAI can indicate only interfering RB allocation within the bandwidth of RBs allocated to the victim UE at least in the case that the resource allocation type of the interfering UE is type 0, type 1, or type 2-L. The format of the IRAI can be determined based on the resource allocation type of the victim UE and/or the number of RBs allocated to the victim UE, and the format of the IRAI can use any one described in the first and second embodiment. Details on the first and second embodiments also apply to the third embodiment.

In the third embodiment, an eNB for performing the above method is provided. The eNB which comprises a transmitting unit has a similar structure as eNB 1200 as shown in FIG. 12. The eNB according to the third embodiment is used for transmitting interfering resource allocation information (IRAI) of multiple interfering user equipments (UEs) attached to a same interfering cell to a victim UE attached to the eNB. The transmitting unit can be configured to transmit the IRAI of the multiple interfering UEs through L1 signaling from the eNB to the victim UE, wherein the indication mode of the IRAI for at least one interfering UE among the multiple interfering UEs is dependent on those interfering UEs whose IRAI has been indicated among the multiple interfering UEs. Similar to eNB 1200, the eNB according to the third embodiment may also comprise other units, and the description on the other units in eNB 1200 can also apply to the eNB in the third embodiment.

Accordingly, at UE side, the third embodiment can be implemented as wireless communication method 2200 as shown in FIG. 22. In particular, the method 2200 is a wireless communication method for receiving interfering resource allocation information (IRAI) of multiple interfering user equipments (UEs) attached to a same interfering cell by a victim UE from a serving eNode B (eNB) to which the victim UE is attached, comprising a step 2201 of receiving the IRAI of the multiple interfering UEs transmitted through L1 signaling from the serving eNB to the victim UE, wherein the indication mode of the IRAI for at least one interfering UE among the multiple interfering UEs is dependent on those interfering UEs whose IRAI has been indicated among the multiple interfering UEs. Further, the method 2200 can further comprises a step of determining the interfering resource blocks (RBs) of a first interfering UE of the multiple interfering UEs as the remaining RBs other than the RBs which have been allocated to the other interfering UEs among the multiple interfering UEs within the system bandwidth of the interfering cell, wherein the IRAI of the first interfering UE is not explicitly transmitted to the victim UE, while the IRAI of the other interfering UEs is explicitly transmitted to the victim UE. In addition or alternatively, the method 2200 can further comprises steps of receiving the maximum number of interfering UEs whose IRAI can be indicated signaled from the serving eNB to the victim UE through RRC signaling, and/or the current number of the multiple interfering UEs whose IRAI is currently to be indicated from the serving eNB to the victim UE signaled within the downlink control information (DCI) of the victim UE for allocating resource to the victim UE; and detecting the IRAI based on the maximum number and/or the current number.

Further, a UE according to the third embodiment for performing the above method is provided. The UE which comprises a receiving unit has a similar structure as UE 1400 as shown in FIG. 14. The UE according to the third embodiment is used as a victim UE for receiving interfering resource allocation information (IRAI) of multiple interfering user equipments (UEs) attached to a same interfering cell from a serving eNode B (eNB) to which the victim UE is attached. The receiving unit can be configured to receive the IRAI of the multiple interfering UEs transmitted through L1 signaling from the serving eNB to the victim UE, wherein the indication mode of the IRAI for at least one interfering UE among the multiple interfering UEs is dependent on those interfering UEs whose IRAI has been indicated among the multiple interfering UEs. Similar to UE 1400, the UE according to the third embodiment may also comprise other units, and the description on the other units in UE can also apply to the UE in the third embodiment.

In the above, the case that the IRAI is transmitted from the serving eNB is described; however, the IRAI can be also be transmitted from the interfering eNB of the interfering cell. The descriptions in the first to third embodiment can also apply to the case that the IRAI is transmitted from the interfering eNB.

Further, it is noted that the term "RB" in the present disclosure can sometimes mean RB pair according to the convention in the art; therefore, the term "RB" herein should be interpreted according to the convention in the art unless the context explicitly or implicitly indicates otherwise.

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A wireless communication method comprising:
   transmitting interfering resource allocation information (IRAI) of multiple interfering user equipments (UEs) attached to an interfering cell, through Layer 1 (L1) signaling from a serving eNode B (eNB) to a victim UE attached to the serving eNB; and
   receiving and processing the IRAI at the victim UE,
   wherein the IRAI of a first interfering UE among the multiple interfering UEs is determined based on resource blocks (RBs) other than those RBs allocated to the rest of the multiple interfering UEs, wherein the IRAI of the rest of the multiple interfering UEs is indicated.

2. The wireless communication method according to claim 1, wherein
   the IRAI of the first interfering UE is not explicitly transmitted to the victim UE, while the IRAI of the rest of the multiple interfering UEs is explicitly transmitted to the victim UE, and
   the RBs other than those RBs allocated to the rest of the multiple interfering UEs within a system bandwidth of the interfering cell are implicitly indicated as allocated to the first interfering UE.

3. The wireless communication method according to claim 2, further comprising performing at least one of:
   signaling a maximum number of interfering UEs whose IRAI can be indicated, from the serving eNB to the victim UE through radio resource control (RRC) signaling, and
   signaling a current number of the multiple interfering UEs whose IRAI is currently indicated, from the serving eNB to the victim UE in a downlink control information (DCI) of the victim UE for allocating resources to the victim UE.

4. The wireless communication method according to claim 2, wherein the IRAI of the rest of the multiple interfering UEs is indicated in a single interfering downlink control information (DCI).

5. The wireless communication method according to claim 1, wherein
   the IRAI of the first interfering UE does not indicate interfering RB allocation within a bandwidth of those RBs allocated to the rest of the multiple interfering UEs.

6. The wireless communication method according to claim 1, wherein
   the IRAI indicates interfering RB allocation within a bandwidth of RBs allocated to the victim UE when a resource allocation type of the first interfering UE is type 0, type 1, or type 2-L as defined in 3GPP Standards.

7. The wireless communication method according to claim 1, wherein a format of the IRAI is determined based on at least one of a resource allocation type of the victim UE and a number of RBs allocated to the victim UE.

8. A wireless communication method performed by a victim user equipment (UE), comprising:
receiving interfering resource allocation information (IRAI) of an interfering UE attached to an interfering cell, through Layer 1 (L1) signaling from a serving eNode B (eNB); and
processing the IRAI to determine interference from the interfering cell,
wherein the IRAI indicates interfering resource block (RB) allocation within a bandwidth of RBs allocated to the victim UE when a resource allocation type of the interfering UE is type 0, type 1, or type 2-L as defined in 3GPP Standards.

9. The wireless communication method according to claim 8, wherein
a format of the IRAI is determined based on at least one of a resource allocation type of the victim UE and a number of RBs allocated to the victim UE.

10. The wireless communication method according to claim 9, wherein if the resource allocation type of the victim UE is type 1, then within the IRAI,
a RB pair-based bitmap is employed, in which 1 bit is used for each RB pair to indicate whether said RB pair in the bandwidth of RBs allocated to the victim UE is interfered by the interfering RB allocation of the interfering UE, when the resource allocation type of the interfering UE is type 0, type 1, or type 2-L, and
a continuous distributed virtual RB (VRB) allocation is used in a system bandwidth corresponding to the interfering UE to indicate the interfering RB allocation of the interfering UE, when the resource allocation type of the interfering UE is type 2-D.

11. The wireless communication method according to claim 9, wherein if the resource allocation type of the victim UE is type 2-D, then within the IRAI,
a RB group (RBG)-based bitmap is used in the bandwidth of RBs allocated to the victim UE to indicate the interfering RB allocation of the interfering UE, when the resource allocation type of the interfering UE is type 0,
a mode of RBG-based bitmap plus RBG subset selection is used in the bandwidth of RBs allocated to the victim UE to indicate the interfering RB allocation of the interfering UE, when the resource allocation type of the interfering UE is type 1,
a continuous localized virtual RB (VRB) allocation is used in the bandwidth of RBs allocated to the victim UE to indicate the interfering RB allocation of the interfering UE, when the resource allocation type of the interfering UE is type 2-L, and
a continuous distributed VRB allocation is used in the bandwidth of RBs allocated to the victim UE to indicate the interfering RB allocation of the interfering UE, when the resource allocation type of the interfering UE is type 2-D, a system bandwidth corresponding to the victim UE is the same as a system bandwidth corresponding to the interfering UE, and a RB gap for the victim UE is the same as a RB gap for the interfering UE, and
type 2-D is used in the system bandwidth corresponding to the interfering UE to indicate the interfering RB allocation of the interfering UE, when the resource allocation type of the interfering UE is type 2-D, and the system bandwidth corresponding to the victim UE is different from the system bandwidth corresponding to the interfering UE or the RB gap for the victim UE is different from the RB gap for the interfering UE.

12. The wireless communication method according to claim 9, wherein
in the IRAI, a RB-based bitmap or RB pair-based bitmap is employed, in which 1 bit is used for each RB or RB pair to indicate whether said RB or RB pair in the bandwidth of RBs allocated to the victim UE is interfered by the interfering RB allocation of the interfering UE, if a number of RBs allocated to the victim UE is smaller than a threshold, and
the threshold is defined such that a total overhead for the IRAI with the RB-based bitmap or RB pair-based bitmap is smaller than a total overhead for the IRAI with a selected format other than the RB-based bitmap or RB pair-based bitmap when the number of RBs allocated to the victim UE is smaller than the threshold.

13. A wireless communication method performed by a victim user equipment (UE), comprising:
receiving interfering resource allocation information (IRAI) of multiple interfering UEs attached to an interfering cell, through Layer 1 (L1) signaling from a serving eNode B (eNB); and
processing the IRAI to determine interference from the interfering cell,
wherein the IRAI of a first interfering UE among the multiple interfering UEs is determined based on resource blocks (RBs) other than those RBs allocated to the rest of the multiple interfering UEs, wherein the IRAI of the rest of the multiple interfering UEs is indicated.

14. The wireless communication method according to claim 13, further comprising:
determining RBs other than those RBs allocated to the rest of the multiple interfering UEs within a system bandwidth of the interfering cell as RBs allocated to the first interfering UE,
wherein the IRAI of the first interfering UE is not explicitly transmitted to the victim UE, while the IRAI of the rest of the multiple interfering UEs is explicitly transmitted to the victim UE.

15. The wireless communication method according to claim 14, further comprising:
receiving at least one of a maximum number of interfering UEs whose IRAI can be indicated signaled, from the serving eNB through radio resource control (RRC) signaling, and a current number of the multiple interfering UEs whose IRAI is currently indicated, from the serving eNB in a downlink control information (DCI) of the victim UE for allocating resources to the victim UE; and
detecting the IRAI based on at least one of the maximum number and the current number.

16. The wireless communication method according to claim 13, wherein
the IRAI of the first interfering UE does not indicate interfering RB allocation within a bandwidth of those RBs allocated to the rest of the multiple interfering UEs.

17. An eNode B (eNB), comprising:
a transmitter, which, in operation, transmits interfering resource allocation information (IRAI) of multiple interfering user equipments (UEs) attached to an interfering cell, through Layer 1 (L1) signaling a victim UE attached to the eNB; and a processor, which is coupled to the transmitter and which, in operation, controls operation of the eNB, wherein the IRAI of a first interfering UE among the multiple interfering UEs is determined based on resource blocks (RBs) other than those RBs allocated to the rest of the multiple interfering UEs, wherein the IRAI of the rest of the multiple interfering UEs is indicated.

18. A user equipment (UE) as a victim UE, comprising:

a receiver, which, in operation, receives interfering resource allocation information (IRAI) of an interfering UE attached to an interfering cell, through Layer 1 (L1) signaling from a serving eNode B (eNB) to which the victim UE is attached; and a processor, which is coupled to the receiver and which, in operation, controls operation of the UE, wherein the IRAI indicates interfering resource block (RB) allocation within a bandwidth of RBs allocated to the victim UE when a resource allocation type of the interfering UE is type 0, type 1, or type 2-L as defined in 3GPP Standards.

19. The UE according to claim 18, wherein a format of the IRAI is determined based on at least one of a resource allocation type of the victim UE and a number of RBs allocated to the victim UE.

20. A user equipment (UE) as a victim UE, comprising:

a receiver, which, in operation, receives interfering resource allocation information (IRAI) of multiple interfering UEs attached to an interfering cell, through Layer 1 (L1) signaling from a serving eNode B (eNB) to which the victim UE is attached; and a processor, which is coupled to the receiver and which, in operation, controls operation of the UE, wherein the IRAI of a first interfering UE among the multiple interfering UEs is determined based on resource blocks (RBs) other than those RBs allocated to the rest of the multiple interfering UEs, wherein the IRAI of the rest of the multiple interfering UEs is indicated.

* * * * *